United States Patent [19]

Wood

[11] Patent Number: 5,401,023
[45] Date of Patent: Mar. 28, 1995

[54] VARIABLE AWARDS WAGERING SYSTEM

[75] Inventor: Michael W. Wood, Denham Springs, La.

[73] Assignee: United Games, Inc., Las Vegas, Nev.

[21] Appl. No.: 123,338

[22] Filed: Sep. 17, 1993

[51] Int. Cl.[6] .................................................. A63F 1/00
[52] U.S. Cl. .............................. 273/85 CP; 273/138 A
[58] Field of Search ........................ 273/85 CP, 138 A

[56] References Cited

U.S. PATENT DOCUMENTS

| | | | |
|---|---|---|---|
| 3,865,368 | 2/1975 | Grazebrook | 273/138 A X |
| 4,593,904 | 6/1986 | Graves | 273/138 A X |
| 4,679,143 | 7/1987 | Hagiwara | 273/138 A X |
| 4,804,185 | 2/1989 | Noble et al. | 273/85 CP |
| 4,926,327 | 5/1990 | Sidley | 273/85 CP X |
| 5,019,973 | 5/1991 | Wilcox et al. | 273/85 CP X |
| 5,022,653 | 6/1991 | Suttle et al. | 273/85 CP |
| 5,046,735 | 9/1991 | Hamano et al. | 273/85 CP |
| 5,098,107 | 3/1992 | Boylan et al. | 273/292 |
| 5,100,137 | 3/1992 | Fulton | 273/85 CP |
| 5,129,652 | 7/1992 | Wilkinson | 273/139 |
| 5,141,234 | 8/1992 | Boylan et al. | 273/306 |
| 5,159,549 | 10/1992 | Hallman et al. | 273/138 A X |
| 5,167,413 | 12/1992 | Fulton | 273/85 CP |
| 5,188,363 | 2/1993 | Marnell et al. | 273/85 CP |
| 5,255,915 | 10/1993 | Miller | 273/85 CP |
| 5,277,424 | 1/1994 | Wilms | 273/85 CP |

Primary Examiner—William H. Grieb
Attorney, Agent, or Firm—Knobbe, Martens, Olson & Bear

[57] ABSTRACT

A modified video poker game where the game initially assigns five cards to the player and the player can then select one of thirty two possible discard strategies to replace any number of the five cards. The video poker game computes the expected value of each discard strategy and then determines which discard strategy is the optimum strategy. If the player selects a discard strategy other than the optimum discard strategy, the award values for winning combinations of cards are adjusted from their default values so that when the expected value of the selected discard strategy is calculated using the adjusted awards, it is substantially equal to the expected value of the optimum strategy calculated using the default awards. The adjusted award values are then displayed on the video screen permitting the player to evaluate the potential awards corresponding to this discard strategy prior to requesting the video poker game to deal the corresponding replacement cards thereby allowing the player to evaluate and select between different, non-optimum, discard strategies.

40 Claims, 9 Drawing Sheets

VARIABLE AWARDS WAGERING SYSTEM

BACKGROUND OF THE INVENTION

1. Field of the Invention

The present invention relates generally to wagering and gaming devices and improvements theretofore including more opportunity for player choices during each round of the game and, more particularly, is concerned with a system for providing real time determination of awards adjusted to account for variations in player strategy,

2. Description of the Related Art

Operators of wagering games are continually seeking new game ideas which provide wide player popularity to promote greater player enjoyment, increased volume of play, and ultimately, higher revenues from their gaming operations. From the point of view of an operator, a successful wagering game is a game which provides the operator a fixed share of all moneys wagered which are within acceptable statistical limits governed by the laws of probability. The operator's share, when expressed as a percentage of the total moneys wagered, is referred to as the "hold percentage." In precise mathematical terms, the hold percentage is the Mathematical Expectation (also referred to as the expected value) of the percentage of moneys wagered, that is kept by the game.

From the point of view of a player, a popular wagering game is a game which is easily understood, entertaining, and perceived as fair by the player. An easily understood game is typically a game that the player can learn to play without investing substantial amounts of time and money learning the rules of the game. Hence, many new wagering games are based upon existing games, such as draw poker, which are well known to the wagering public.

Further, the most entertaining games are often those games which offer players choices of different strategies to employ to win the game so as to provide the player with the perception that he has some influence over the final outcome of the game. Generally, players also prefer games in which, during any one extended play session or round, there is a reasonable chance of winning more than what is being risked in order to play the game. Preferably, the game must, on average, provide the player with a predictable share of the moneys wagered which are within acceptable statistical limits governed by the laws of probability. The share of the money wagered that is returned to the player is commonly known as the "payback percentage." Games with high payback percentages are generally preferred by players, as the perception that the players may win more than what they are risking on these games is generally stronger.

However, many players of wagering games are dissuaded from playing a certain type of game when they feel that the game is designed so that only experienced or intelligent players are likely to be successful. For example, a player who lacks the rudimentary knowledge of the strategies and probabilities used in playing poker is, of course, less likely to sit down and play a game of poker. Consequently, wagering games where the player must make decisions and select strategy which can potentially influence the outcome of the game often discourage less experienced players from playing. Hence, a need exists in the prior art for a wagering game which provides an opportunity for players to make decisions which can potentially influence the outcome of games, to thereby enhance the entertainment value of the game, but does not necessarily penalize the player for making less than the best decision in selecting strategy.

Additionally, a need also exists in the prior art for a game which supplies the player with more information about the potential outcome of the game using a contemplated strategy so as to allow the player greater choices and more information in evaluating differing strategies for playing the game. Specifically, even those players who are sufficiently skilled to ascertain the optimum play strategy are often inclined to select a less than optimum play strategy when playing a particular hand. Consequently, the wagering game would be more popular to these players if the awards they received for selecting the less than optimum play strategy is increased. Further, if the potential increased awards for the non-optimum strategy are displayed to the player, the player can use this information in selecting strategy and the popularity of the game would be further increased.

Furthermore, many governmental agencies are now sponsoring wagering games such as lotteries. One feature of the games that are allowed in many different states is that they must be games of chance where skill cannot influence the outcome of the game. Heretofore, this requirement has limited the wagering games in these jurisdictions to only those games, such as lotteries, where no matter the selection or choice made by the player, the likelihood of any single player winning is the same as it is for any other player for equal wager amounts. This, unfortunately, has limited the wagering games that can be provided in these jurisdictions, and, furthermore, many of these jurisdictions are experiencing a decline in the popularity of the games currently available which has resulted in a corresponding decline in government revenue provided by these games.

Hence, there is a further need for a simple wagering game that affords added entertainment by providing the players an opportunity to make choices and select strategy during the course of the game, that is still a game of chance, and that does not reward skilled or experienced players over less experienced players. Further, there is also a need for a game which adjust potential awards based on player strategy and which displays the adjusted potential awards to the player to provide the player with additional information to use in selecting a game playing strategy. Such a game can then be used in those states which limit wagering games that are not games of skill but games of chance only.

In order to rectify these shortcomings, Applicant has developed the following invention which can be used to provide a wagering game which can provide additional information about the outcome of the game based on a strategy contemplated by the player. Further, Applicant's invention can also be used to modify a game so that the amount of money won by choosing the optimum strategy over a long period of time is substantially equal to the amount of money won by choosing a non-optimum strategy.

SUMMARY OF THE INVENTION

The aforementioned needs are satisfied by the present invention which comprises a modification to games where, during the playing round, the player receives a first number of game elements and can use one of a plurality of strategies to select additional game elements to obtain a winning combination of game elements at the end of the round. The modification consists of adjusting the award values for winning combinations of game elements depending upon the strategies contemplated by the player and displaying these adjusted awards to the player so that the player can use this information in selecting a strategy to play the game. In a specific application, the present invention contemplates adjusting the award values so that the expected value of the strategy contemplated calculated using the adjusted award by the player is substantially equal to the expected value of the optimum or best strategy, calculated using the default award value, that could be employed given the game elements the player initially received.

Applicant's invention can thus be implemented on any game in which there are a plurality of game elements with identifying characteristics where the player receives a set number of these elements and where certain combinations of these elements are defined to be winning combinations for which an award is given. Applicant's invention modifies such a game by changing the award received for winning combinations based on the strategy employed so that the expected value of the strategy employed is equal to the expected value of the optimum strategy.

In one specific aspect of the present invention, Applicant's invention is implemented on a well known video poker game. After the player has made his wager and received his initial cards, the player then selects which cards he intends to hold and which cards he intends to discard. At this time, the video poker game, modified by the present invention, calculates the optimum strategy of holding and discarding cards having the highest expected value. The video poker game then determines whether the player is using the optimum strategy. If the player is using the optimum strategy, the player is then paid awards for the winning combinations he receives at the end of the round based on a default awards table. If, however, the player has not selected the optimum strategy, the video poker game then calculates the expected value of the strategy selected by the player and then mathematically adjusts the awards for winning combinations from the default award values so that the expected value of the strategy employed by the player, calculated with the adjusted awards, is substantially equal to the expected value of the optimum strategy calculated with the default awards. If the player subsequently receives a winning combination of cards, the player is then paid the corresponding adjusted awards.

In a further aspect of the present invention as implemented on a video poker game, the video poker game is programmed to display the adjusted awards to the player after a hold and discard strategy is selected for the cards originally received. This permits the player to evaluate the possible strategies and gives the player a greater choice in how to play a given hand.

These and other objects and features of the present invention will become more fully apparent from the following description and the appended claims taken in conjunction with the accompanying drawings.

DETAILED DESCRIPTION OF THE PREFERRED EMBODIMENTS

Reference is now made to the drawings where like numerals refer to like parts throughout. A well-known video poker game, modified to permit implementation of one preferred embodiment of the present invention, is initially described in reference to FIGS. 1–3. The operation of this modified video poker game while it performs one preferred embodiment of the present invention is then described in references to the exemplary flowcharts shown in FIGS. 4–6.

Figure 1:
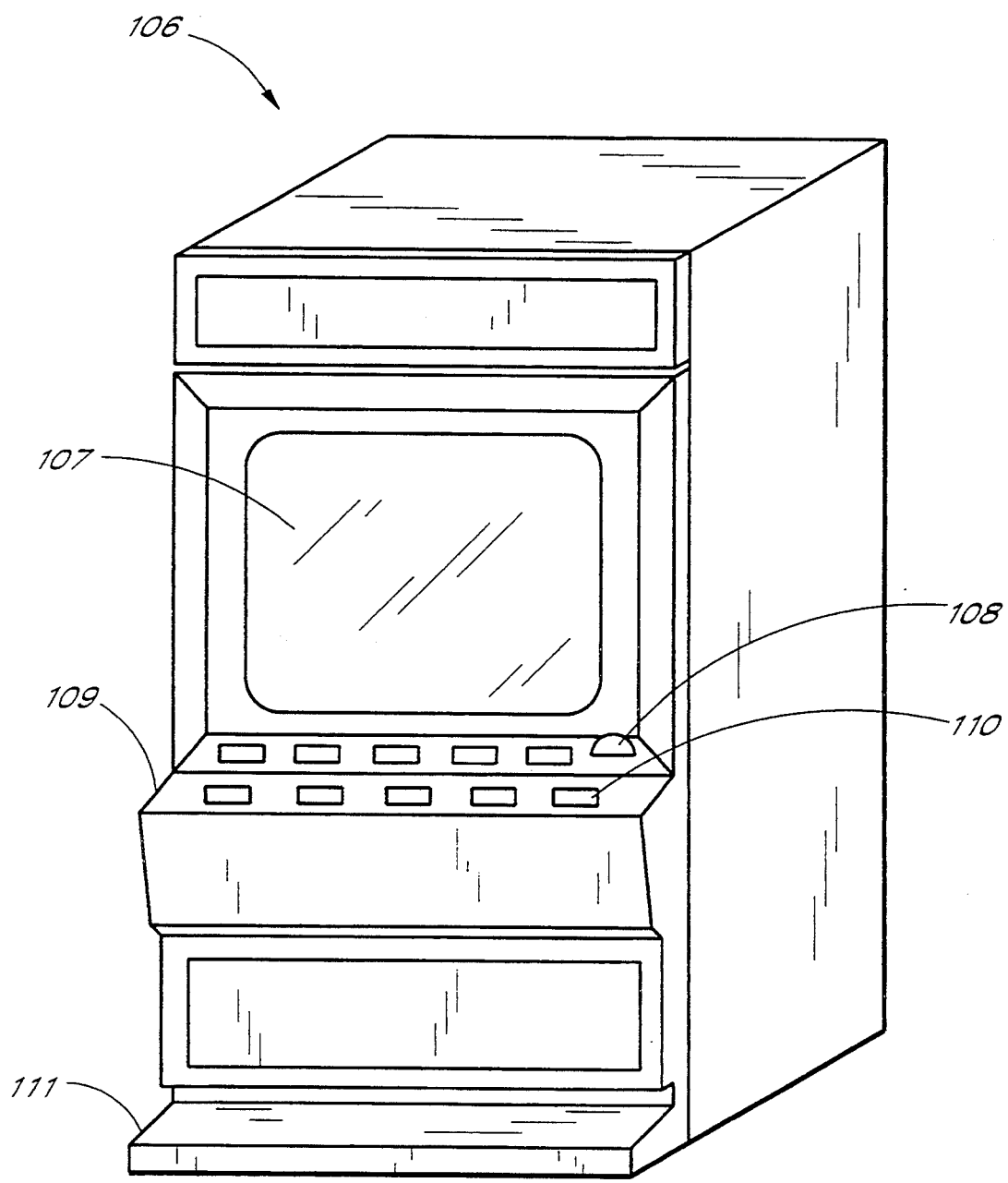
FIG. 1 is a perspective view of a prior art 906III Casino Mini Model Video Poker Game made by United Coin Machine Co. on which one preferred embodiment of the invention is implemented.

FIG. 1 shows a typical prior art video poker game 106, such as a Model 906III Casino Mini Video Poker Machine manufactured by United Coin Machine Company. This video poker game 106 is generally rectangular in shape and contains a video display screen 107 on which various instructions and representations of playing cards are made visible to the player.

The video poker game 106 also includes a coin accepting mechanism 108 configured to receive coins or tokens. Generally, the types of coins or tokens accepted by the coin accepting mechanism 108 form the basic "unit" of valuation for the machine, and all awards are then dispensed in integer multiples of these units. Other games of this type may also be equipped with a paper currency acceptor in addition to the coin acceptance mechanism. The video poker game 106 also contains a control button panel 109 (showing ten control buttons 110) which permits the player to start the game, place bets, select cards to be held and cards to be discarded, and collect accrued winnings. The video poker game 106 also contains a coin return tray 111 in which any awards that the player receives are deposited either after each winning round, or when the player cashes out his accumulated credits stored by the video poker game 106.

Figure 2:
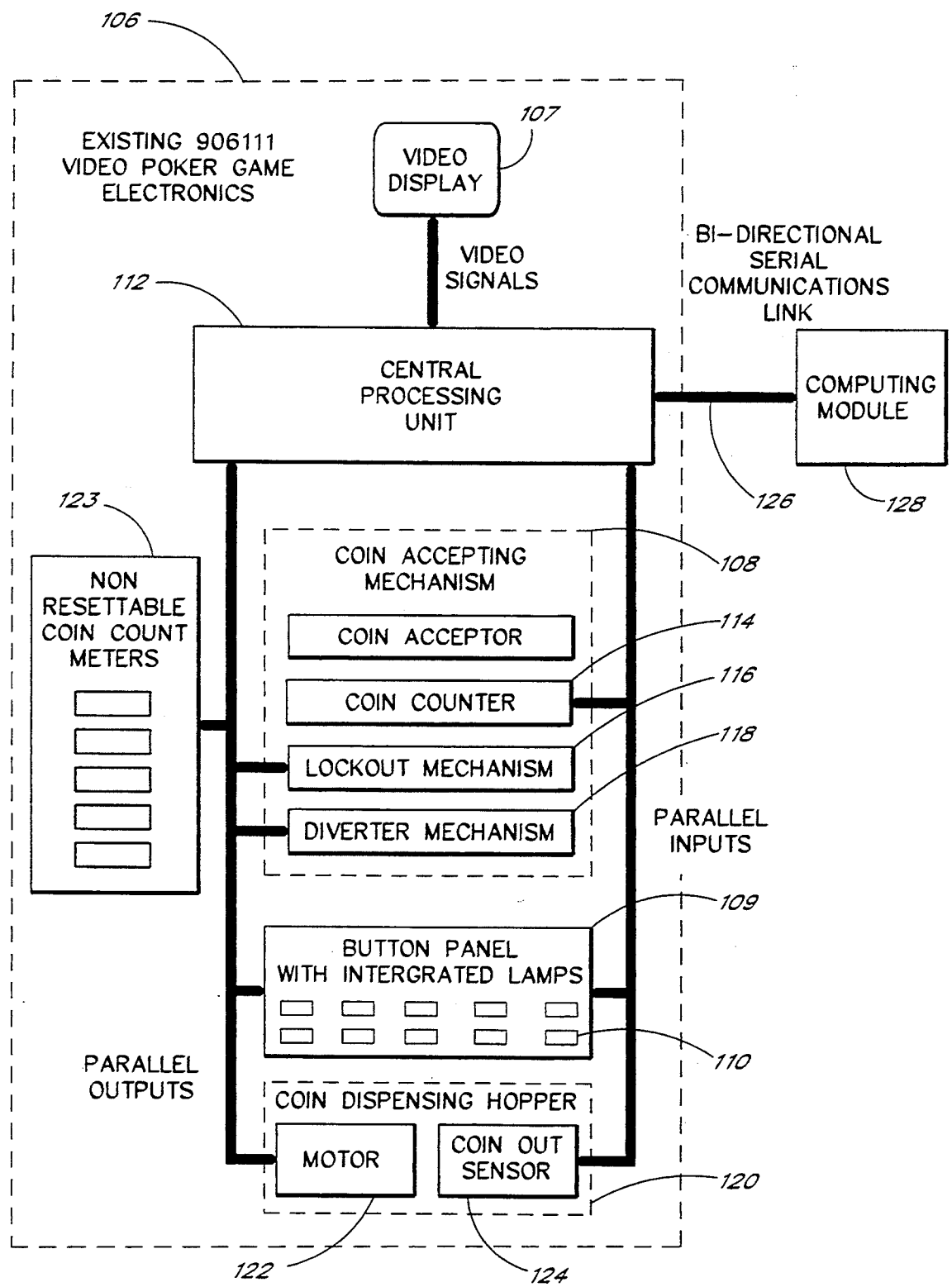
FIG. 2 is a block diagram of a preferred embodiment of the present invention showing the basic electrical implementation of the invention on the 906III Casino Mini Model Video Poker Game shown in FIG. 1.

FIG. 2 is a block diagram illustrating the hardware components comprising a preferred embodiment of Applicant's invention as it is implemented in a video poker game 106 like the game shown in FIG. 1. In particular, it is noted that the video poker game 106 typically contains the video display screen 107 which is electrically connected to a central processing unit 112 which, in the case of the Model 906III Casino Mini Video Poker Machine built by United Coin Machine Company, is a Rockwell 6502 micro-processor based central processing unit. The central processing unit 112 controls all of the game functions including shuffling the deck, randomly selecting the cards to be dealt to the player, reading the player's inputs on the control buttons 110, determining the awards according to the pay schedule shown in Table 1 below, and causing representations of the cards, as well as instructions, to be displayed to the player on the video display screen 107. The central processing unit 112 is also electrically connected to the coin accepting mechanism 108.

The coin accepting mechanism 108 includes a coin counter 114 which provides inputs to the central processing unit 112 of all the coins entered into the game. This permits the central processing unit 112 to, among other things, base awards, if any, on the number of coins entered in each round. The coin accepting mechanism 108 also contains a lockout mechanism 116 which prevents coins from being accepted by the machine at inopportune times, e.g. in the middle of a hand, under error conditions, etc. The coin accepting mechanism 108 also contains a diverter mechanism 118 which directs each coin into either a locked container for later removal (not shown) or into a payout hopper 120 for eventual payout to players in the form of awards. A series of non-resettable coin count meters 122 which keep a non-volatile record of coins wagered, coins won, coins diverted into the locked container and other relevant information necessary to monitor game performance are also electrically coupled to the central processing unit 112.

Further, these control buttons 110 on the control panel 109 are preferably capable of being lit by an integrated lamp in response to signals generated by the central processing unit 112, indicating that the button can be activated by the player. Each of the buttons 110 in the control button panel 109 provides inputs to the central processing unit 112, thereby permitting the central processing unit 112 to perform operations in response to the inputs provided by the player.

A coin dispensing hopper 120 including a motor 122 and a coin out sensor 124 is also electrically connected to the central processing unit 112. When an award situation arises or when the player cashes out his accumulated credits, the central processing unit 112 generates signals which cause the motor 122 to activate resulting in the coin dispensing hopper 120 dispensing coins into the coin return tray 10. The coin out sensor 124 counts the number of coins dispensed by the hopper 120 and, when the correct amount of coins has been dispensed, the sensor 124 sends a signal to the central processing unit 112 which then turns off the motor 122 thereby stopping the dispensing of coins.

Award coins can either be dispensed after each round in which an award has been won, or they can be accrued in a credit account referred to as a credit meter (not shown). The current balance of the credit meter is displayed to the player on the video screen 107 and the player can either make wagers using the accumulated credits by depressing an appropriate button 110 or he can similarly "cash out" his credits by depressing another control button 110.

Connected via a bi-directional serial communication link 126 to the central processing unit 112 is a computing module 128. The computing module 128 calculates the probability of attaining winning combinations, the expected value $EV_j$ for each of the discard strategies open to the player, determines which discard strategy is the optimum strategy, i.e., provides the highest expected value, and also generates adjusted awards $A_{adj,n}$ for the strategy selected by the player, as will be described in greater detail in reference to the exemplary flowcharts shown in FIGS. 4–6. As can be appreciated by a person skilled in the art, the interface between the central processing unit 112 and the computing module 128 can also consist of a parallel data communication interface instead of the serial communication link 126.

Well known protocols and techniques are preferably used to ensure the accuracy of the data communicated between the central processing unit 112 and the computing module 128. Further, the video poker game 106 can also be equipped with a sufficiently fast microprocessor or central processing unit 112 to perform the calculations of the expected value $EV_j$ of the various strategies open to the player and to also perform the calculations resulting in the adjusted awards $A_{adj,n}$ described below.

Figure 3:
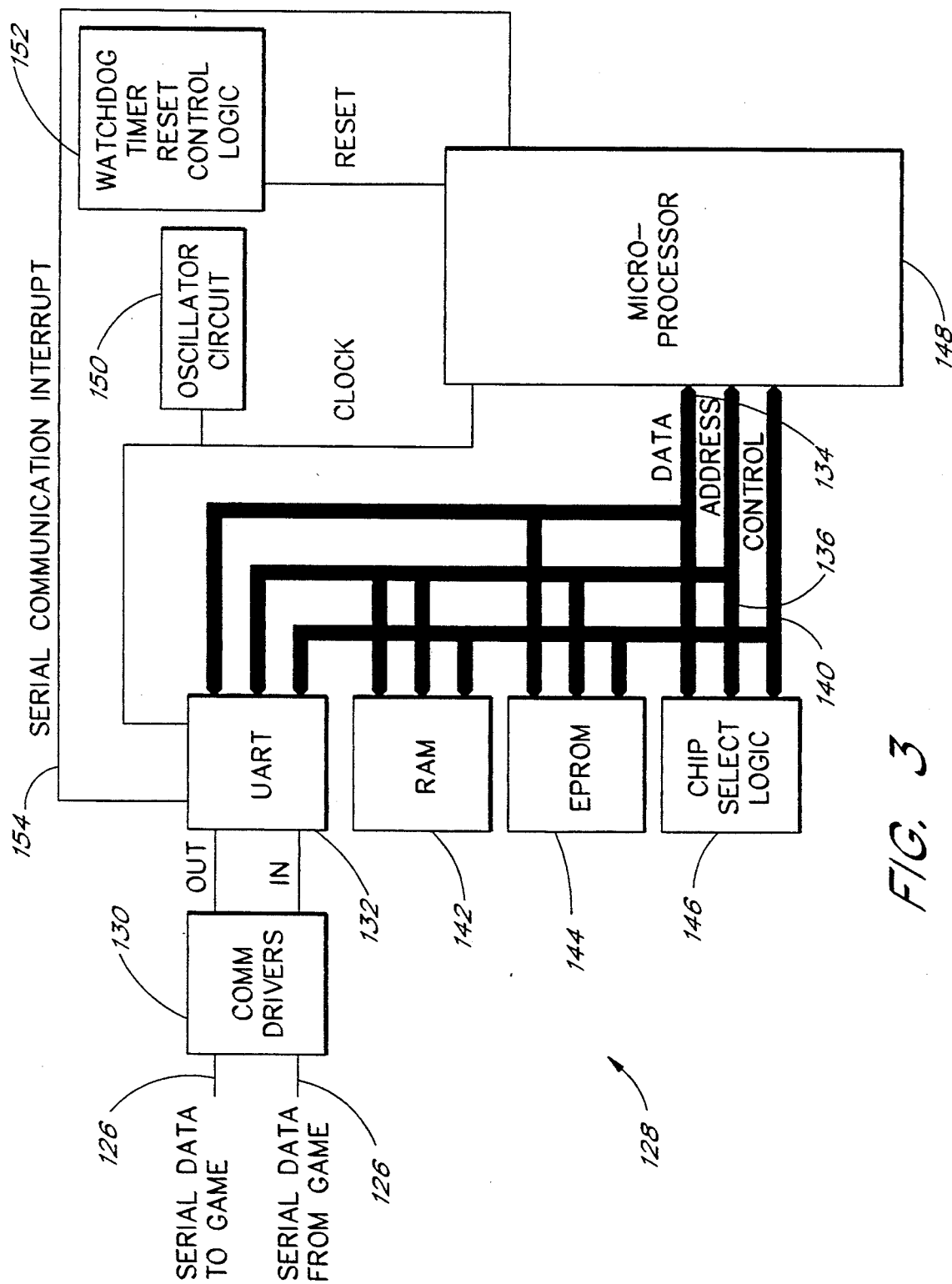
FIG. 3 is a block diagram of the computing module of the preferred embodiment shown in FIG. 2.

FIG. 3 is a block diagram showing the components of the computing module 128. The bi-directional serial communications link 126 is connected to a communication driver circuit 130 which contains a communication driver for providing serial data to the central processing unit 112 of the video poker game 106 and a communication receiver for receiving serial data from the central processing unit 112 in the video poker game 106. Preferably, these are National Semiconductor, DS 1488 and DS 1489 communication drivers respectively. The communication driver circuit 130 has both an input and an output to a Universal Asynchronous Receiver and Transmitter (UART) 132 of a type known in the art such as an Intel 8251 UART. The UART 132 translates the serial signals received from the communication driver circuit 130 into parallel signals for processing by the computing module 128, and it translates parallel signals received from other components of the module 128 into serial signals capable of being serially sent to the central processing unit 112 in the video poker game 106 via the bi-directional communication link 126.

The UART 132 is connected to the rest of the module 128 via a data input/output bus 134, an address input/output bus 136 and a control input/output bus 140. Each of these busses are also connected to a Random Access Memory (RAM) array 142, an erasable programmable read only memory (EPROM) array 144, a chip select logic circuit 146 and a microprocessor 148. The microprocessor 148 is preferably an Advanced Micro Devices AM29050 microprocessor which receives data from the central processing unit 112 via the UART 132 and the data bus 134, about the pay table type which indicates which award schedule is currently in effect, the starting hand that the player has received and the current amount of any incremental awards, commonly referred to as progressive jackpots, the cards the player intends to hold, as well as extra bytes of information used to verify that the transmitted data is not corrupted during the communication process.

The EPROM array 144 is preferably comprised of four connected Intel 27256 32k×8 U.V. erasable programmable read only memories, which contain the algorithm for performing the calculation of the expected values and the algorithms for calculating the probabilities of attaining winning combinations, as will be described in greater detail in reference to FIG. 5 below, and which also contains the algorithms for performing the calculation of the adjusted awards $A_{adj,n}$ as will be described in greater detail in reference to FIGS. 6A, 6B and 6C below. The Random Access Memory Array 142 is preferably comprised of four Hitachi 6264 8k×8 RAMs, which will store the intermediate values calculated by the microprocessor 148 when it is implementing algorithms stored in the EPROM array 144 on the data provided by the central processing unit 112 of the video poker game 106.

The Chip Select Logic circuit 146 is preferably an Advanced Micro Devices 29MA16 Programmable Array Logic (PAL) circuit which controls and addresses the flow of information over the busses 34, 36 and 40 to the various components in response to input signals from the microprocessor 148. An oscillator circuit 150 providing a clock input is also connected to the microprocessor 148 and to the UART 132. A watchdog timer and reset control logic circuit 152 is also connected to the microprocessor 148 which resets the microprocessor 148 when it detects an error in its operation or during its powering up process. The UART 132 can also send a serial communication interrupt signal on a serial communication interrupt signal line 154 to the microprocessor 148 when the UART has completed either sending or receiving a character or packet of data.

The typical operation of prior video poker games such as the game shown in FIG. 1 is as follows. The player inserts a coin or multiple coins into the coin accepting mechanism 108. The machine 106 then deals five cards from a randomly shuffled deck of 52 cards, representations of which are then displayed on the video screen 107. The machine is also configured to deal and display the five cards in response to the player depressing one of the control buttons 110 which wagers one or more of the player's accumulated credits.

The player then selects the cards he wishes to keep or "hold" and the cards he wishes to discard by manipulating more of the buttons 110 on the control button panel 109. The player then depresses a draw button causing the poker game 106 to replace the cards the player discarded with fresh cards randomly selected from the remaining 47 cards of the 52 card deck. Representations of these new cards are then displayed on the video screen 107 in the place of the discarded cards.

If the representation of the cards now shown on the video screen 107 is one of a pre-selected winning combination of cards, the player receives an award. A typical schedule of awards, known as a pay table or pay schedule, is shown in Table 1 below, where the default awards $A_n$ for each of the well known winning combination of playing cards are expressed in terms of coins won per coin wagered.

TABLE 1

| FINAL HAND | AWARD AMOUNT (Coins Won Per Coin Wagered) |
|---|---|
| Pair of Jacks or Beter | 1 |
| Two Pairs | 2 |
| Three of a Kind | 3 |
| Straight | 4 |
| Flush | 5 |
| Full House | 6 |
| Four of a Kind | 25 |
| Straight Flush | 50 |
| Royal Flush | 800 |

The awards $A_n$ are selected so that, given a uniformly distributed sequence of cards, the hold percentage, or the percent of money wagered which is retained by the video poker game 106, is sufficiently high that the game operator is receiving a fair return on his investment in the video poker game 106. Generally, the awards $A_n$ are selected so that, assuming that each player who plays the game uses the optimum strategy, or the strategy which provides the player with his maximum expected return for his wager, the video poker game 106 still attains the pre-selected hold percentage. Consequently, most video poker games 106 retain somewhat more money than the pre-selected hold percentage as most players do not always use the optimum strategy when selecting cards to be held or discarded.

Variable award wagering as implemented on the previously described video poker game 106 presents a unique variation to the standard video poker game having the winning combinations shown in Table 1 above. Specifically, in the standard video poker game 106, once the player receives his initial five cards, he has a total of 32 possible strategies that he can employ in discarding cards for replacement. The 32 possible strategies are illustrated in Table 2 below:

TABLE 2

| Number of Cards Discarded | Number of Ways to Discard |
|---|---|
| 0 | 1 |
| 1 | 5 |
| 2 | 10 |
| 3 | 10 |
| 4 | 5 |
| 5 | 1 |
| Total Number of Ways to Discard | 32 |

The player can employ several different types of tactics to select a discard strategy for any given hand. For example, the player can select a discard strategy which either maximizes the number of wins, the total winnings, or the probability of winning a Royal Flush or similar big jackpot hand. Further, the player can also rely upon intuition about the replacement cards that might be dealt or some other unscientific method of selecting a discard strategy.

Of the thirty two discard strategies, there is at least one strategy which provides the highest expected value EV or mathematical expectation of winning awards. The expected value of any single discard strategy $EV_j$ selected in video poker is equivalent to the sum of probability of attaining each of the winning combinations, using the selected discard strategy, multiplied by the award respectively given for each of the winning combinations and is given by the following formula:

$$EV_j = \sum_{n=1}^{N} P_{nj} * A_n \quad (1)$$

where
$EV_j$: Expected Value of awards paid assuming the jth discard strategy is used;
N: Total number of winning hands which are assigned awards (for the awards table shown in Table 1 above N=9);
$P_{n,j}$: Probability of winning the nth award given the first five cards dealt and the jth discard strategy is used; and
$A_n$: Award for the nth winning combination.

By using this formula, the expected value $EV_j$ of each of the thirty two discard strategies can be calculated, and the optimum strategy having the greatest expected value $EV_{opt}$ can then be determined.

In the typical video poker game using 52 cards, the probability of attaining any single winning combination using one of the thirty two discard strategies is a fixed number assuming a uniform distributed sequence of cards. If the awards $A_n$ for winning combinations are also fixed, the maximum expected return for player who routinely selects a non-optimum discard strategy is less than the maximum expected return for the player who routinely selects the optimum discard strategy.

However, in accordance with the principles of the present invention, it is possible to normalize, or equate, the expected value of the jth discard strategy $EV_j$ selected by the player to the expected value of the optimum discard strategy $EV_{opt}$ for each hand that is played. This can be accomplished by adjusting the awards $A_n$ given for winning combinations attained by the player who is using a non-optimum discard strategy. Consequently, inexperienced or less skilled players who are not capable of recognizing the optimum discard strategy will win substantially the same amount of money over the long term as experienced players who do generally recognize and select the optimum discard strategy. Further, this also encourages more freedom on the part of the player in selecting discard strategies on the basis of intuition or other tactics like trying to maximize the award given for the hand as there is no net penalty for using these tactics since the awards corresponding to the strategy selected are adjusted so that the expected value calculated using the adjusted awards is substantially the same as the expected value of the optimum strategy calculated using the default awards given in Table 1.

Figure 4A:
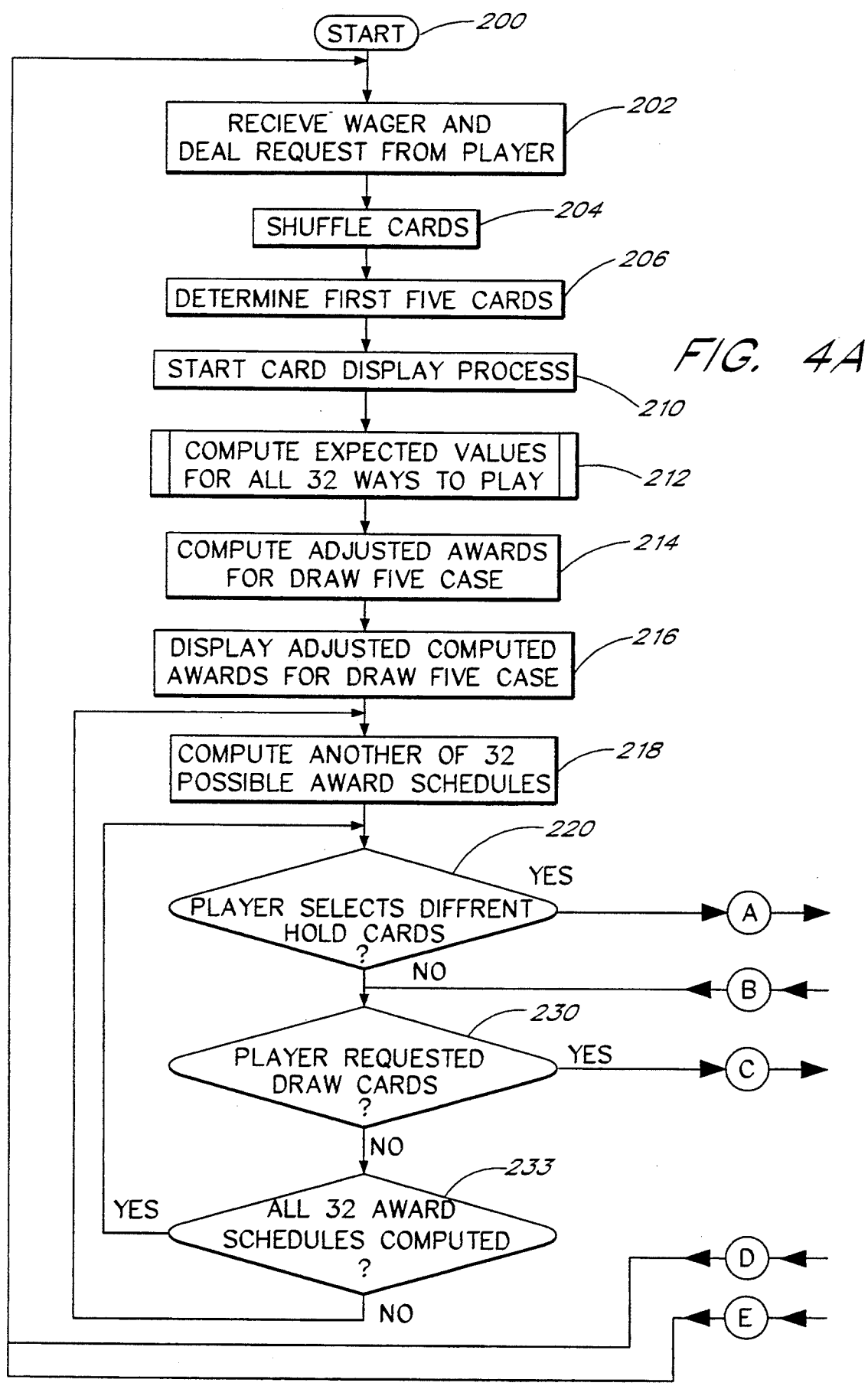
FIGS. 4A and 4B illustrate an exemplary flow diagram of the operation of the preferred embodiment of the video poker game shown in FIG. 2, during the course of a single five card video poker hand.
Figure 4B:
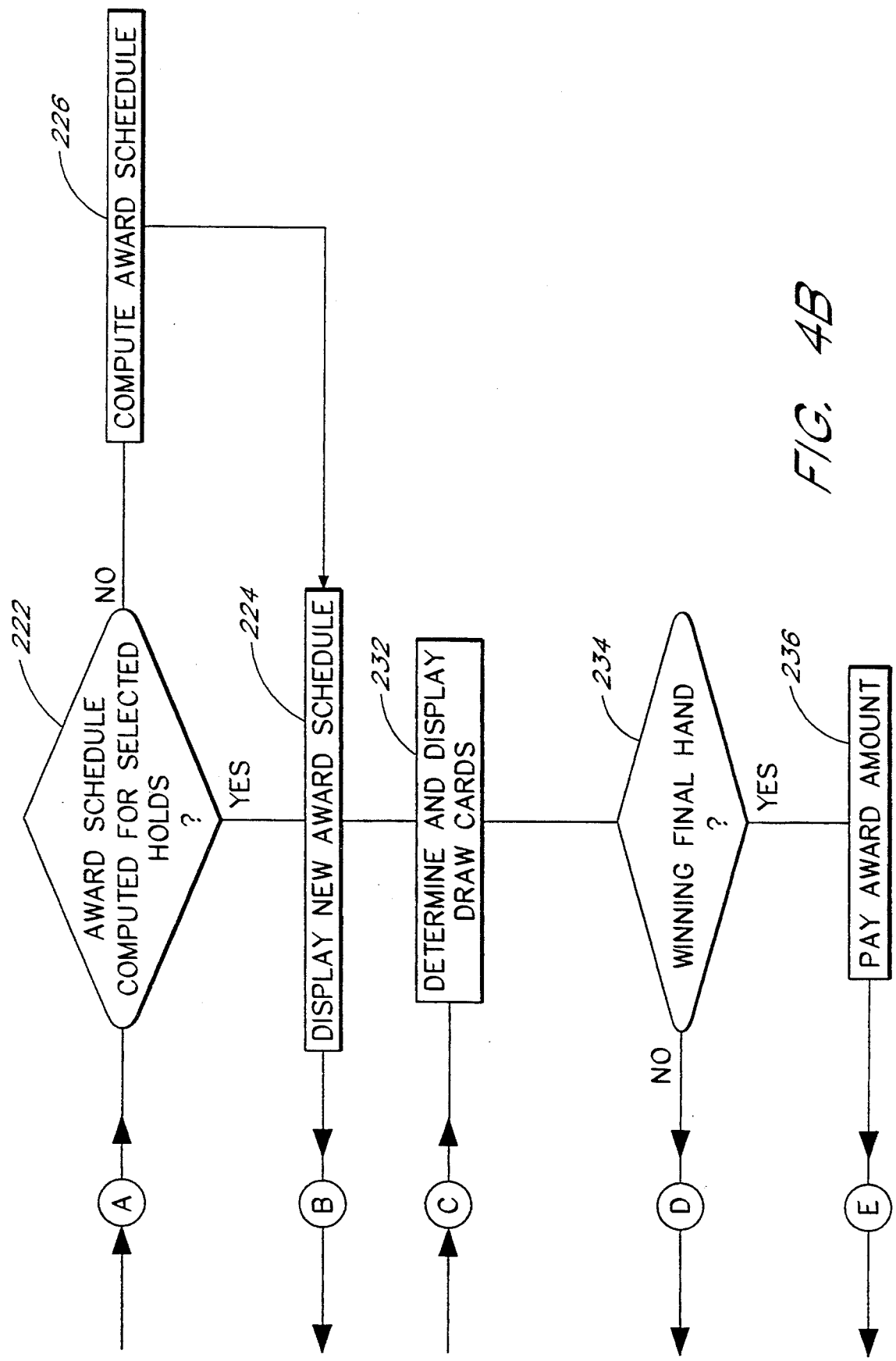

FIGS. 4A and 4B illustrate an exemplary flow chart demonstrating how the variable awards wagering system of the present invention is implemented on the video poker game 106 described previously in reference to FIGS. 1–3 during the course of a single hand of video poker. From a start state 200, where the video poker game 106 is preferably displaying on the video display 107 a prompt for players to deposit coins to begin playing a round as well as other promotional type displays, the game 106 receives the wager and deal request from the player in state 202. In state 202, the player typically deposits a certain number of coins in the coin mechanism 108 (FIG. 1) and then depresses a deal button 110 on the button panel 109 signalling the central processing unit 112 of the video poker game 106 to randomly select and deal five cards from the fifty two card deck.

Once the player has depressed the deal button 110 on the button panel 109, the central processing unit 112 electronically shuffles the cards to ensure a random distribution of cards in state 204. The central processing unit 112 then randomly determines, in state 206, which of the cards are the five cards that are to be initially given to the player. Once the initial five cards have been determined, the video poker game 106 then initiates a process in state 210 by which representations of these five cards are displayed on the video display screen 107.

While the video poker game 106 is displaying representations of the five cards on the video display 107, the video poker game 106 begins a function 212 whereby the probabilities of obtaining winning combinations based on the initial five cards using each of the thirty-two possible discard strategies are calculated. Also, in the function 212 the expected value $EV_j$ of each of the thirty two possible strategies for discarding and replacing the initial five cards are calculated, based on the initial five cards the player received and the default awards $A_n$ given for winning combinations (Table 1). These calculations are performed by the computing module 128 as described in greater detail in reference to FIG. 5 below. After the probabilities and expected values $EV_j$ for each of the thirty two play strategies have been determined, the video poker game 106 then determines the optimum game or discard strategy having the highest expected value $EV_{opt}$.

The video poker game 106 then preferably computes, in state 214, the adjusted awards $A_{adj,n}$ for the discard strategy of replacing all the five cards originally received so that the expected value of this play strategy, using the adjusted award values $A_{adj,n}$, is substantially equivalent to the expected value of the optimum play strategy $EV_{opt}$ using the default award values $A_n$ given in Table 1. This computation is performed by an adjusted awards function 300 which is described in greater detail in reference to FIGS. 6A, 6B and 6C below. Once the adjusted award values $A_{adj,n}$ are determined in the adjusted awards function 300, for the discard all five cards case the video poker game 106 then displays in state 216 an awards table having the adjusted award values $A_{adj,n}$ for each of the possible winning combinations on the video display screen 107.

Preferably, the video poker game 106 is programmed to display the adjusted awards for each of the discard strategies selected by the player. In state 214, prior to the player discarding any cards, the video poker game 106 calculates the adjusted awards corresponding to replacing each of the five cards as the player, at this time, has not depressed any of the hold buttons 110 (FIG. 1) signalling that he does not wish to discard a particular card.

The central processing unit 112 of the video poker game 106 then begins a loop where it sequentially performs the adjusted awards function 300 for each of the remaining thirty one discard strategies by calculating the adjusted award for the next discard strategy in state 218. After the adjusted awards $A_{adj,n}$ for the next discard strategy is computed, the video poker game 106 ascertains, in decision state 220, whether the player has selected a discard strategy by depressing one or more of the hold buttons 109 on the button panel 110. If the player has depressed a hold button 109 for one or more of the cards, the video poker game 106 then proceeds, through the transition state labelled A, in FIG. 4A to decision state 222 (FIG. 4B) where it determines whether the adjusted awards function 300 has been performed for the discard strategy corresponding to the card or cards the player has selected to hold.

If the adjusted awards $A_{adj,n}$ have been determined for this strategy, the video poker game 106 displays, in state 224, an awards table on the video display 107 having the adjusted award values $A_{adj,n}$ for each of the winning combinations that the player can attain with this discard strategy. This allows the player to evaluate the adjusted awards $A_{adj,n}$ he will receive for winning hands using this particular discard or game strategy. However, if, in decision state 222, the central processing unit 112 determines that the adjusted awards function 300 has not been calculated for the discard strategy corresponding to the cards the player has selected to hold, the video poker game 106 proceeds to perform in state 226 the adjusted awards function 300 for the discard strategy corresponding to the cards held by the player. Once the adjusted awards $A_{adj,n}$ have been determined for the winning combinations attainable using the selected discard strategy, the video poker game 106 displays the adjusted awards $A_{adj,n}$ in tabular form on the video display screen 107 in state 224.

After displaying the adjusted awards $A_{adj,n}$ for the discard strategy corresponding to the cards the player has selected to hold, the central processing unit 112 of video poker game 106 then proceeds to decision state 230 (FIG. 4A) through a transition state, labelled B in FIGS. 4A and 4B where it determines whether the player has depressed a deal button 110 on the control panel 109 commanding the video poker game 109 to deal replacement cards for the cards the player has selected to discard. The video poker game 106 also proceeds to decision state 230 if it has determined in the decision state 222 that the player has not selected to hold or discard any cards in decision state 200.

If the central processing unit 112 determines in decision state 230 that the player has depressed the deal button 110, the central processing unit 112 then proceeds to state 232 (FIG. 4B), through a transition state labelled C, where it randomly selects and displays the replacement cards on the video display screen 107. Once the replacement cards are displayed, the video poker game 106 then determines whether the displayed cards correspond to a winning hand in decision state 234. If the cards do not correspond to a winning hand, the video poker game 106 returns to the start state 200 (FIG. 4A) through a transition state labelled D where it awaits the next wager by a player. If the cards do correspond to a winning hand, the video game 106 then proceeds to pay, in state 236, the adjusted award amount $A_{adj,n}$ for the winning hand determined by the adjusted award function 300 for the discard strategy selected by the player, after which the central processing unit 112 then returns to the start state 200 via the transition state labelled E.

If, however, the central processing unit 112 determines in decision state 230 (FIG. 4A) that the player has not yet depressed the deal button 110, the central processing unit 112 then determines whether the adjust awards function 300 has been calculated for all thirty two possible discard strategies in decision state 233. If the adjust awards function 300 has not been computed for all thirty two possible discard strategies, the central processing unit 112 returns to state 218 where the adjust awards function 300 is performed for the next possible discard strategy. If, however, the central processing unit 112 determines that the adjust awards function 300 has been calculated for each of the thirty two possible discard strategies in decision state 233, the central processing unit 112 returns to decision state 220 where it awaits a signal indicating that the player has depressed a hold button 112 indicating that the player has selected a discard strategy.

In this fashion, the video poker game 106 allows the player to play a modified version of video poker wherein the default awards $A_n$ are adjusted when the player selects the non-optimum discard strategy so that the probability that the player will win a given amount of coins is substantially the same using the selected strategy as it would be if the player has selected the optimum discard strategy. Further, since the adjusted awards $A_{adj,n}$ are displayed on the video display 107 prior to the player depressing the deal button 110 and receiving his replacement cards, the player can view the adjusted awards $A_{adj,n}$ for different discard strategies by simply depressing different hold buttons 110. The player can then use this information about the different possible adjusted awards $A_{adj,n}$ to assist in choosing a discard strategy. For example, the player may decide to select a discard strategy which would provide for a very large adjusted award so as to maximize their potential winnings in a single round of the game.

Figure 5:
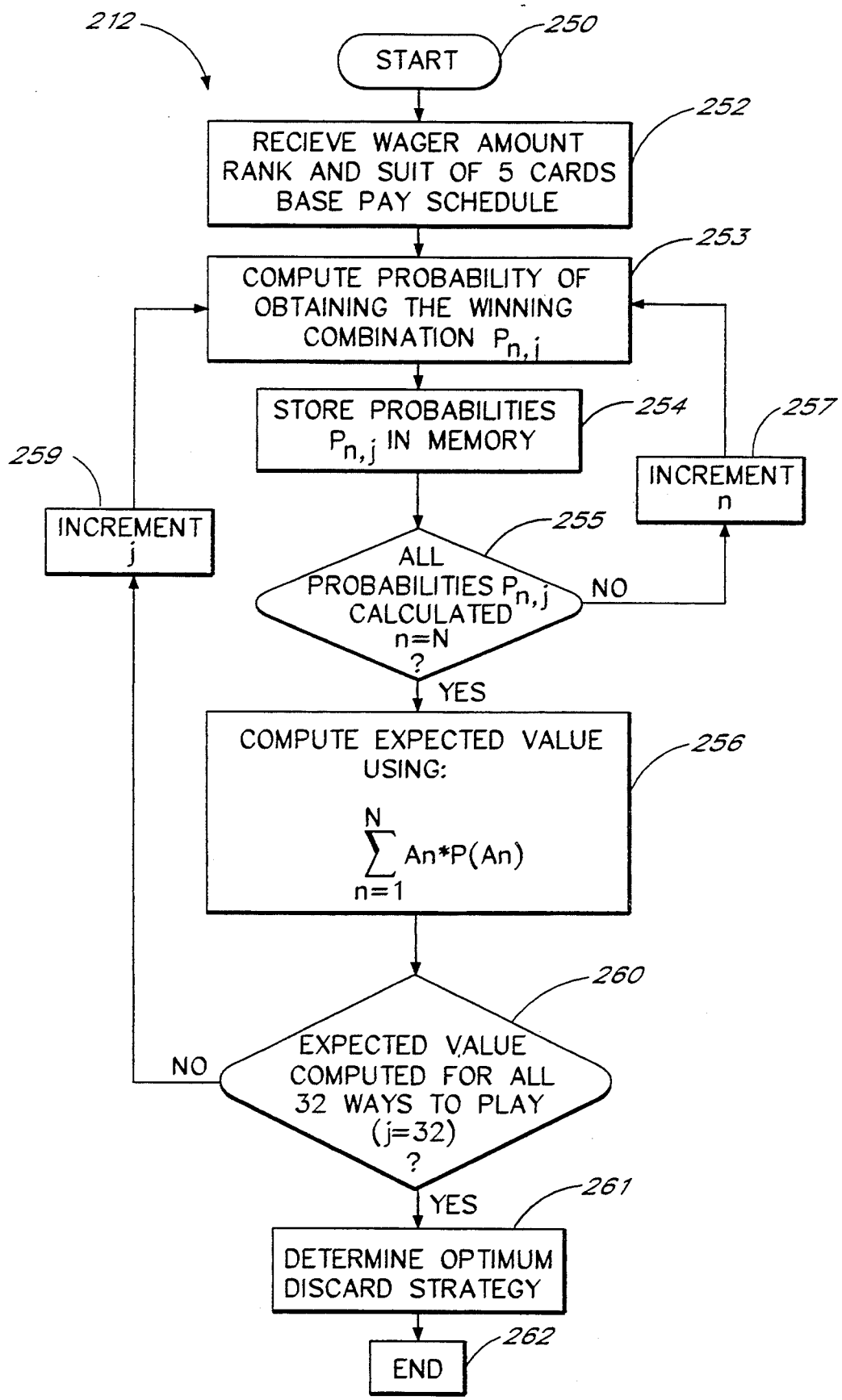
FIG. 5 illustrates an exemplary flow diagram of the expected value function shown in FIG. 4A where the probabilities of attaining winning combinations and the expected values of each of the 32 possible play strategies are calculated.

FIG. 5 is an exemplary flow chart illustrating the operation of the computing module 128 as it performs the probability and expected value calculations for each of the thirty two possible discard strategies given the initial five cards dealt to the player in state 206 are performed in the function 212. In this preferred embodiment of the present invention, the function 212 is performed by the computing module 128 (FIG. 3) in response to the central processing unit 112 sending the computing module 128 an appropriate signal including information on the initial five cards received by the player in state 206 (FIG. 4A) and amount wagered by the player.

Specifically, from a start state 250, the computing module 128 receives in state 252 a signal indicative of the amount wagered by the player in state 202, the rank and suit of each of the five cards dealt to the player in state 206 and the base or default award values $A_n$ currently in use in the video poker game 106 from the central processing unit 112 via the bi-directional communications link 126. The computing module 128 then determines, in state 253, the probability of obtaining one of the N possible winning combinations using one of the thirty two possible discard strategies $P_{n,j}$.

In this preferred embodiment of the present invention the computing module 128 determines the probability of obtaining the winning combinations of a pair of jacks or greater, two pair, three of a kind, full house and four of a kind, by using look up tables stored in the EPROM 144 (FIG. 3). The look up tables include the probability of obtaining each of the winning combinations for each possible five card combination having been initially dealt to the player. These probability values in the look up tables have been precalculated in any well known manner and, further, the look up tables are preferably indexed according to both the possible card combinations held by the player and possible card combinations discarded by the player.

For the winning combinations of a flush, a straight, a straight flush, and a royal flush, the computing module 128 preferably uses any of a number of well known techniques such as look up tables or counter based algorithms to determine the likelihood of obtaining one of these winning combinations given the cards held and discarded by the player. In this fashion, each of the probabilities of obtaining winning combinations for a given discard strategy are determined. Once the probability of obtaining the nth winning combination is determined in state 253, the computing module 128 stores, in state 254, this probability in the RAM 142 (FIG. 3) for later use by the computing module 128.

The computing module 128 then decides in decision state 255 whether the probabilities of obtaining each of the N possible winning combinations $P_{n,j}$ has been determined. If these probabilities have not been determined for each of the N possible winning combinations, the computing module 128 increments an n counter in state 257 by one and then returns to state 253 to determine the probability of obtaining the nth winning combinations as incremented for the next discard strategy. If all the probabilities have been determined (i.e., n has been incremented in state 257 until n=N), the computing module 128 then calculates the expected value of a first discard strategy $EV_1$ using the formula (1) reproduced below:

$$EV_j = \sum_{n=1}^{N} P_{nj} * A_n \qquad (1)$$

where
- EV: Expected Value of awards paid assuming the jth discard strategy is used;
- N: Total number of winning hands which are assigned awards (for the awards table shown in Table 1 above N=9);
- $P_{n,j}$: Probability of winning the nth award given the first five cards dealt and that the jth discard strategy is used;
- $A_n$: Award for the nth winning hand type; and
- j: one of thirty two discard strategies for which the expected value is being calculated.

Assuming that video poker game 106 uses the winning combinations and default award amounts shown in Table 1, for the first discard strategy, the computing module 128 recalls the probability of attaining each of the nine winning combinations based on the first discard strategy WHICH WERE STORED IN MEMORY IN STATE 254. Once these probabilities are recalled, they are multiplied by the default award values and the product of each of the probabilities and default award values are then summed. The sum of the products $A_n * P(A_n)$ is then the expected value for the first discard strategy $EV_1$ and it is then stored in the RAM 142 of the computing module 128 (FIG. 3).

The computing module then determines in decision state 260 whether the expected value of each of the thirty-two possible discard strategies have been calculated. If not all the expected values for the thirty-two discard strategies have been calculated, the computing module 128 increments a j counter in state 259 by one and returns to state 253 where it then proceeds to determine probability of obtaining the N winning combinations using the jth discard strategy as incremented in the previously described fashion. Subsequently, the expected value for this discard strategy is determined in state 256. If the computing module 128 determines in decision state 260 that the expected value for all of the j possible discard strategies 1 to 32 have been calculated, the computing module 128 then determines which discard strategy has the highest expected value and is thus the optimum discard strategy in state 261. Subsequently, the computing module 128 moves to an end state 262 where the expected values are stored for later use.

In this fashion, the computing module 128 computes and stores the probabilities of obtaining winning combinations for each of the possible discard strategies as well as the expected value corresponding to each of the possible discard strategies. These determined values are then subsequently used in the adjusted award function 300 to adjust the default awards $A_n$ when the player selects a non-optimum discard strategy.

Figure 6A:
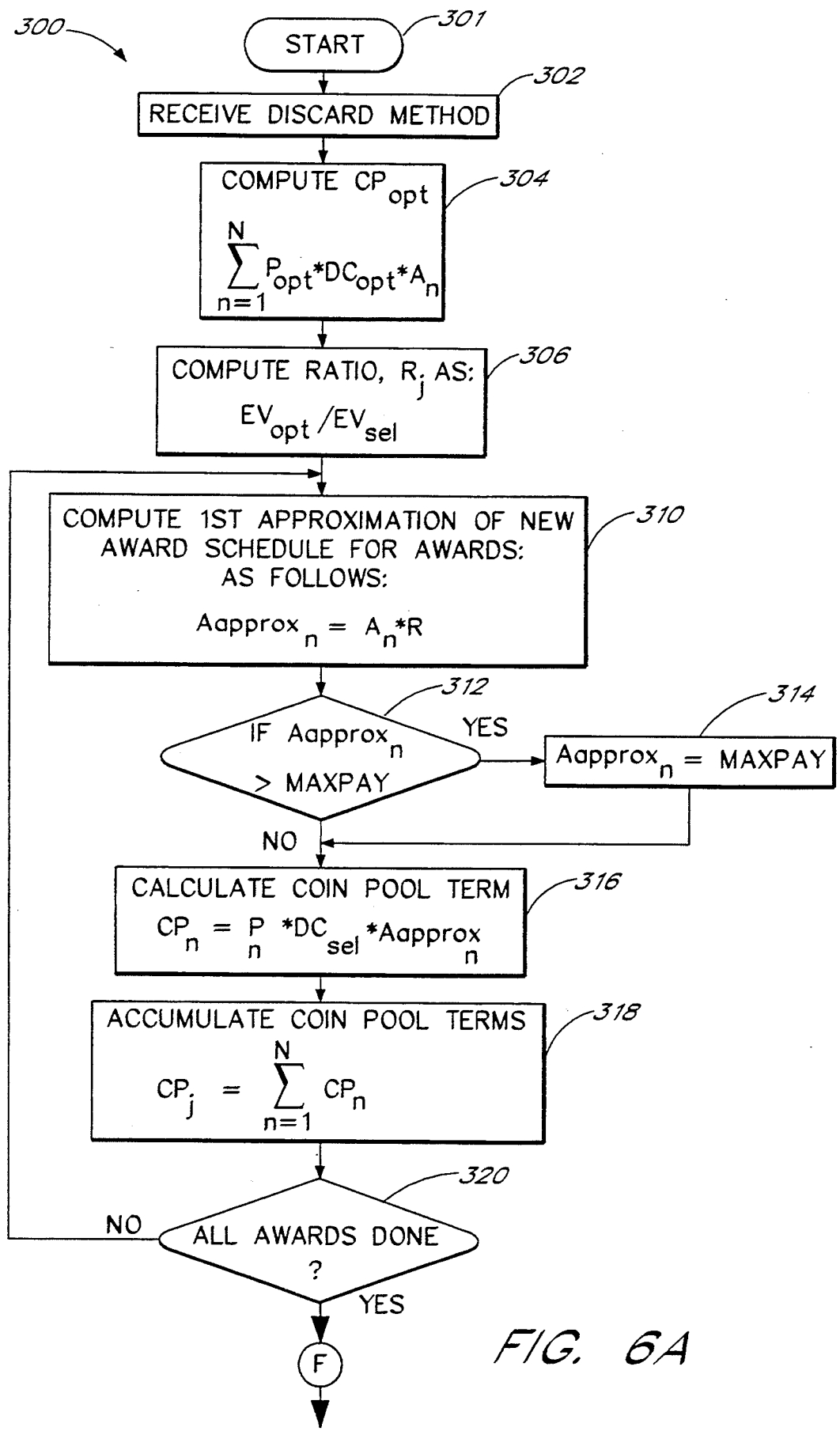
FIGS. 6A, 6B and 6C illustrate an exemplary flow diagram of the awards adjustment function called in FIG. 4A, where the awards for winning combinations are adjusted for a particular play strategy.
Figure 6B:
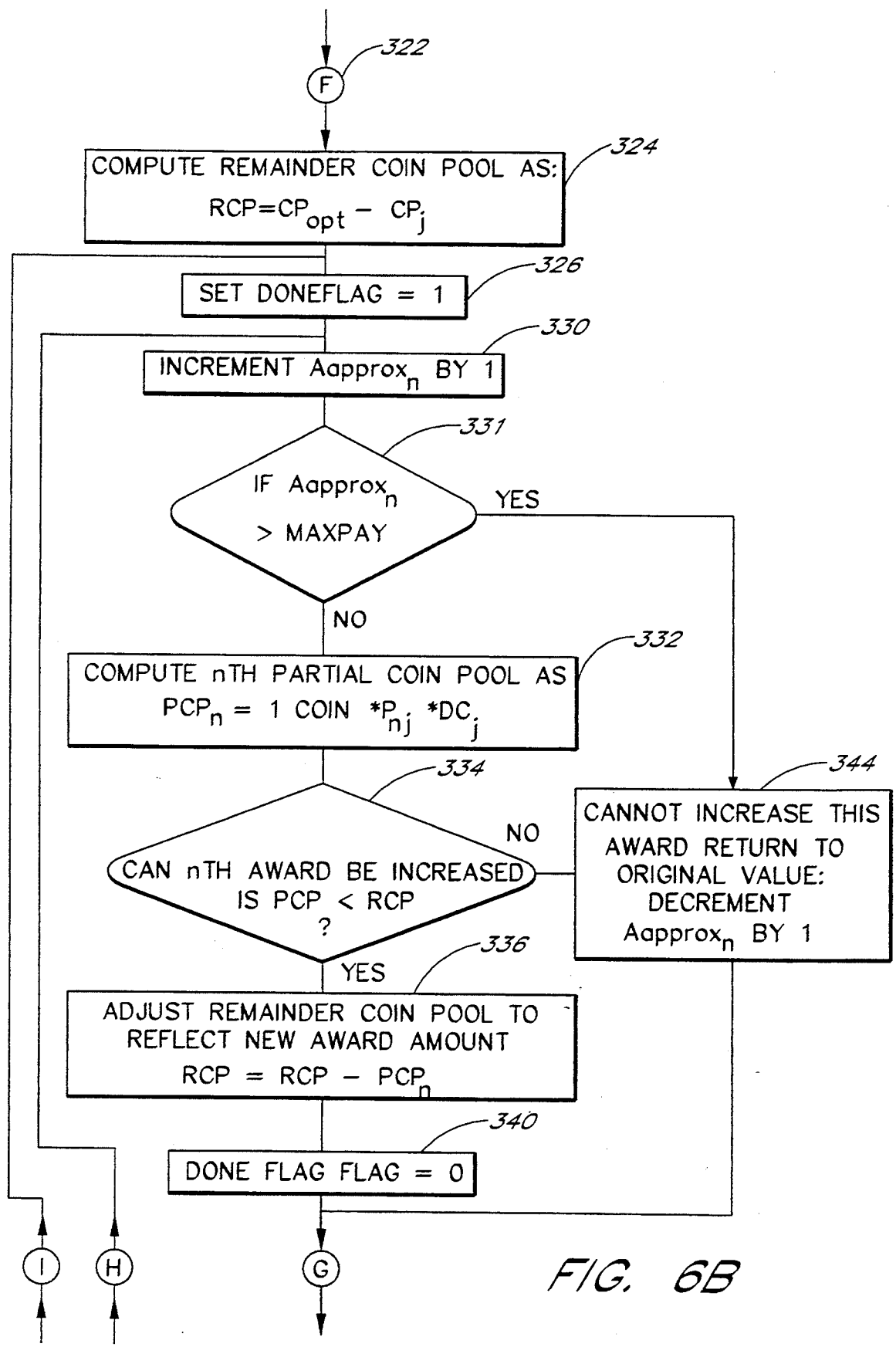
Figure 6C:
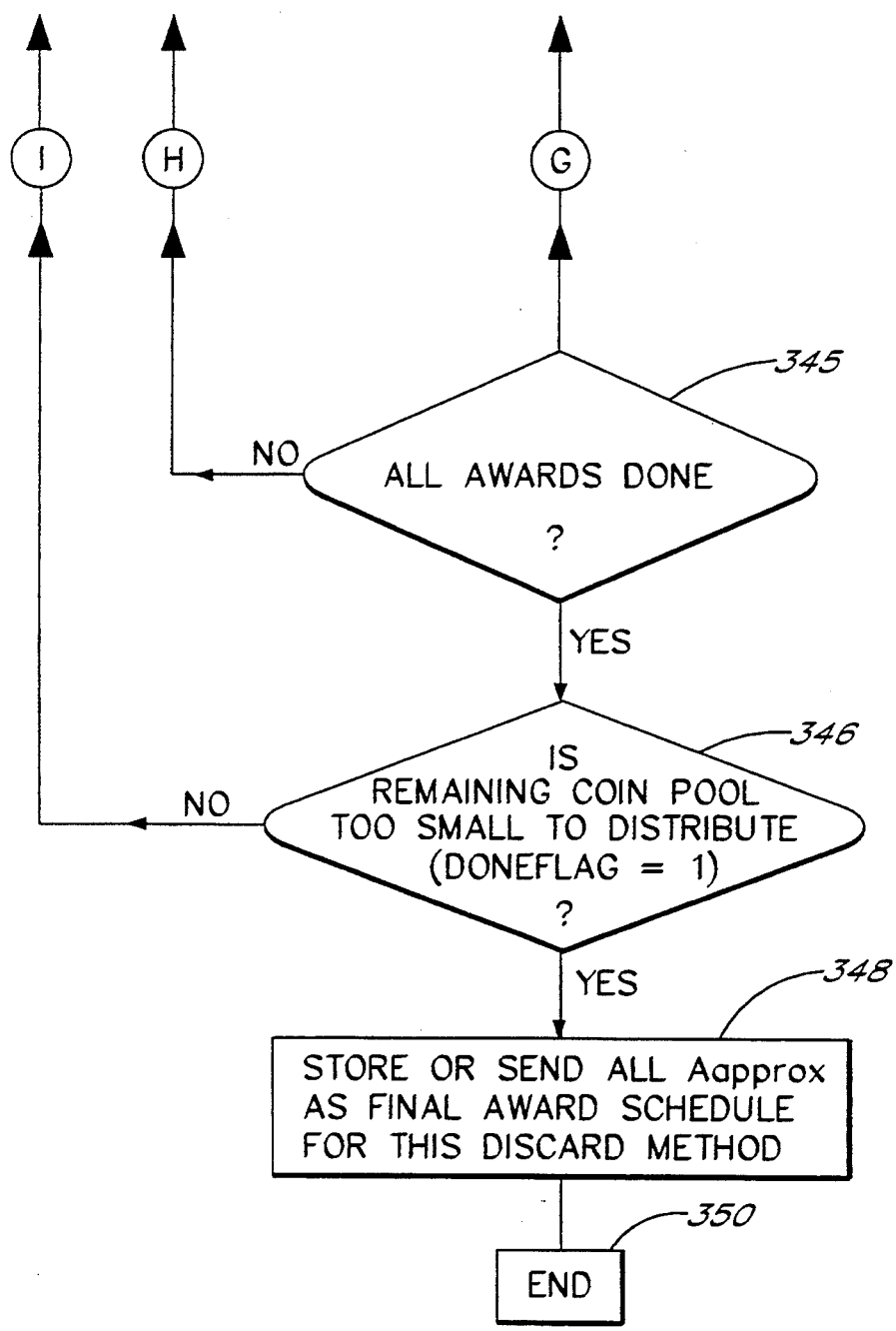

FIGS. 6A, 6B and 6C illustrate an exemplary flow chart of the adjusted awards function 300 by which the default awards $A_n$ are adjusted so that the expected value of the selected strategy determined using this value is substantially the same as the optimum expected value. This function 300 is performed by the computing module 128 in response to receiving an appropriate signal from the central processing unit 112 of the video poker game 106. By way of an overview, to equate the expected value a non-optimum discard strategy to the expected value of the optimum discard strategy $EV_{opt}$, the function 300 essentially performs a two step process. Initially, a first approximation $A_{approx,n}$ of the adjusted award value $A_{adj,n}$ is made. The first approximation $A_{approx,n}$ is made by computing the ratio between the expected value of the optimum discard strategy $EV_{opt}$ and the discard strategy selected by the player $EV_{sel}$ according to the following formula:

$$R_j = EV_{opt}/EV_{sel} \qquad (2)$$

The default award values $A_n$ for the winning combinations as shown in Table 1 above are each then multiplied by the ratio $R_j$ so that the first approximation $A_{approx,n}$ of the adjusted awards for this particular discard strategy is computed.

Once the first approximation of the adjusted awards $A_{approx,n}$ is computed, it is truncated, as the video poker game 106 is incapable of dispensing fractional coin values as awards to the players. As a consequence, the expected value of the selected strategy $EV_{sel}$ as calculated using the truncated $A_{approx,n}$ and the probability of attaining the winning combinations using the selected discard strategy $P_{n,sel}$ is still less than the optimum expected value $EV_{opt}$ calculated using the default award values $A_n$ and the corresponding probability of attaining a winning combination $P_{n,opt}$. Hence the second step of the awards adjustment function 300 essentially consists of increasing the truncated first approximated award values $A_{approx,n}$ values one coin at a time in an attempt to minimize the difference between the optimum expected value $EV_{opt}$ and the expected value of the selected discard strategy $EV_{sel}$ calculated using the $A_{approx,n}$ award values. Once the difference between these two expected values is fully minimized, the resulting approximated adjusted award values $A_{approx,n}$ become the adjusted awards $A_{adj,n}$.

One preferred method of increasing the first approximation of the adjusted awards $A_{approx,n}$ to determine the correct adjusted award value $A_{adj,n}$ is to initially compute the total potential coin pool resulting from the optimum discard strategy $CP_{opt}$ using the default awards $A_n$ and the total potential coin pool resulting from the selected strategy $CP_{sel}$ using the first approximation of the adjusted awards $A_{approx,n}$. These coin pools can be computed according to the following formulas:

$$CP_{sel} = \sum_{n=1}^{N} P_{n,sel} * DC_{sel} * A_{approx,n} \qquad (3)$$

where:
- $CP_{sel}$: Coin Pool for the selected discard strategy;
- $P_{n,sel}$: Probability of attaining the nth winning combination given the first 5 cards dealt and using the selected discard strategy;
- $A_{approx,n}$: First approximation of award to be paid for the nth possible winning combination;
- $DC_{sel}$: Number of possible final outcomes for the selected discard strategy;

$$CP_{opt} = \sum_{n=1}^{N} P_{n,opt} * DC_{opt} * A_n \qquad (4)$$

where:
- $CP_{opt}$: Coin Pool for the optimum discard strategy;

$P_{nopt}$: Probability of attaining the nth winning combination given the first 5 cards dealt using the optimum discard strategy;

$A_n$: the default award values paid for the nth winning combination;

$DC_{opt}$: Number of possible draw combination or for the optimum discard strategy;

As can be appreciated, the number of possible draw combinations for each discard strategy $DC_j$ is dependant upon the number of cards discarded. The number of possible draw combinations $DC_j$ is essentially the number of possible ways of drawing the desired number of cards from the remaining forty seven cards in the deck. For example, there are only 47 ways to draw a single card from a forty seven card deck. The number of draw combinations $DC_j$ can be determined from the following formula:

$$DC_j = x!/[r! * (x-r)!] \qquad (5)$$

where:

x: is the number of cards remaining in the deck;
r: is the number of cards discarded;

Using formula (5), the $DC_j$ values, summarized in tabular form in Table 3 below, for the forty seven remaining cards for the discard strategies involving discarding zero to five cards can be calculated.

TABLE 3

| Number of Discards | Rationale | $DC_j$ |
|---|---|---|
| 0 | | 1 |
| 1 | 47 cards taken 1 at a time | 47 |
| 2 | 47 cards taken 2 at a time | 1081 |
| 3 | 47 cards taken 3 at a time | 16,215 |
| 4 | 47 cards taken 4 at a time | 178,365 |
| 5 | 47 cards taken 5 at a time | 1,533,939 |

Once the coin pools $CP_{opt}$ and $CP_j$ are computed, a Remaining Coin Pool $RCP_j$ is then computed by determining the difference between the Optimum Coin Pool $CP_{opt}$ and the Coin Pool for the discard strategy $CP_{sel}$. The remaining coin pool $RCP_j$ is representative of the difference between the optimum expected value $EV_{opt}$ and the expected value of the selected discard strategy calculated using the first approximation of the adjusted awards $A_{aprox,n}$. Hence this is the number of potential coins that must be distributed to the various first approximations of adjusted awards $A_{approx,n}$ to attain the adjusted awards $A_{adj,n}$ which will substantially equates these expected values.

Further, for each possible winning combination, a partial coin pool $PCP_n$ is also calculated according to the following formula:

$$PCP_n = \text{One Coin} * P_{n,j} * DC_j \qquad (6)$$

where;

$PCP_n$: the partial coin pool that results from increasing the nth first approximation of the adjusted award $A_{approx,n}$ by one coin;

$P_{n,j}$: the probability of attaining the nth winning combination using the jth discard method;

$DC_j$ the final number of possible outcomes or draw combinations corresponding to the jth discard strategy;

Subsequently, the first approximation of the adjusted award $A_{approx,n}$, starting with the award corresponding to the winning combination with the highest probability of occurrence, e.g., pair of jacks or better, is incremented by one coin and the remaining coin pool RCP is decreased by the partial coin pool $PCP_n$ corresponding to this increment of the first approximation of the adjusted award $A_{approx,n}$ provided that the partial coin pool for this winning combination $PCP_n$ is less than the remaining coin pool $RCP_1$.

If the partial coin pool for a given winning combination $PCP_n$ is greater than the remaining coin pool $RCP_j$, there are insufficient coins in the remaining coin pool $RCP_j$ to increment this first approximation of the adjusted award $A_{approx,n}$ by one coin. Consequently, this condition prevents fractional incrementations of the approximated adjusted award $A_{approx,n}$ and thereby prevents adjusted award values $A_{adj,n}$ having fractional components which the video poker game 106 could not distribute.

Each of the approximated adjusted awards $A_{approx,n}$ for winning combinations are increased by one coin and the remaining coin pool $RCP_j$ is decreased in this fashion until the partial coin pool $PCP_n$ for each of the awards $A_{approx,n}$ is greater or equal to the remaining coin pool $RCP_j$. At this point none of the awards $A_{approx,n}$ can be increased by a whole coin, so the approximated adjusted award values $A_{approx,n}$ are then equal to the adjusted awards for this discard strategy $A_{adj,n}$. Any remaining coins could then accumulated into a breakage account and can later be dispersed to the players in subsequent rounds if desired or retained by the game operator. The adjusted expected value $EV_{adj,j}$ of the strategy employed by the player can then be calculated according to the formula below:

$$EV_{adj,j} = \sum_{n=1}^{N} P_{n,j} * A_{adj,n} \qquad (7)$$

The adjusted expected value $EV_{adj,j}$ of the strategy employed by the player using the adjusted awards $A_{adj,n}$ is then substantially equal to the optimum expected value $EV_{opt}$. Exact equivalence between the adjusted expected value $EV_{adj,j}$ and $EV_{opt}$ is usually not attainable due to the inability of the game to disperse partial coin awards, however, using the above described process, the adjusted expected value $EV_{adj,j}$ of the strategy selected by the player can be closely approximated to the optimum expected value $EV_{opt}$.

FIGS. 6A, 6B and 6C illustrates an exemplary flow diagram of the adjusted award function 300 performed by the computing module 128 as it generates the adjusted awards $A_{adj,n}$ for the jth selected discard strategy.

From a start state 301, the computing module 128 awaits, in state 302, a signal from the video poker game 106 indicative of the cards originally received by the player in state 206 (FIG. 4A) and the discard strategy currently selected by the player or determined by the video poker game 106. The signal also preferably includes information on the optimum discard strategy including the optimum expected value $EV_{opt}$. Once this signal is received in state 302, the computing module 128 then computes, in state 304, the optimum coin pool $CP_{opt}$ using the formula:

$$CP_{opt} = \sum_{n=1}^{N} P_{n,opt} * DC_{opt} * A_n \qquad (8)$$

Once the optimum coin pool $CP_{opt}$ has been determined, the computing module 128 recalls from the RAM 142 the expected values corresponding to both the optimum discard strategy $EV_{opt}$ and the selected discard strategy $EV_{sel}$ by recalling from the RAM 142 (FIG. 3) the probability values corresponding to the optimum discard strategy and multiplying each of these values by the total number of draw combinations $DC_{opt}$ and the default award values $A_n$ in state 306 and then computes the ratio $R_j$ between the optimum expected value $EV_{opt}$ and the expected value of the selected discard strategy $EV_{sel}$ according to the formula:

$$R_j = EV_{opt}/EV_{sel} \qquad (9)$$

The computing module 128 then computes a first approximation of the adjusted award $A_{approx,n}$ for the first default award $A_n$, corresponding the winning combinations listed in Table 1, by multiplying the default award $A_n$ by the ratio $R_j$ in state 310.

The computing module 128 then determines in decision state 312 whether the first approximation of the adjusted award $A_{aprox,n}$ computed in state 310 is greater than a MAXPAY variable. The MAXPAY variable is selected so that the video poker game 106 does not pay an award greater than a preselected amount. The size of the MAXPAY variable can be dependent upon the financial ability of the owner of the video poker game 106 to pay the award, and can also be dependent upon legal requirements which dictate the operation of these games. If the first approximation of the adjusted award $A_{approx,n}$ is not greater than the MAXPAY variable, the computing module 128 then computes the coin pool term $CP_{n,sel}$ for the first award using selected strategy in state 316. However, if the first approximation of the adjusted award $A_{approx,n}$ is greater than the MAXPAY variable, the computing module 128 sets the first approximation of the adjusted award $A_{approx,n}$ to be equal to the MAXPAY variable in state 314 before proceeding to state 316.

In state 316, the computing module 128 determines the coin pool term $CP_{j,n}$ by multiplying the probability of attaining the nth winning combination $P_n$, calculated in the function 212 (FIG. 5) and stored in the RAM 142 (FIG. 3), by the corresponding first approximation of the adjusted award $A_{approx,n}$ determined in state 310 and the number of final possible outcomes for the selected discard strategy $DC_{sel}$. Subsequently, the computing module 128 then accumulates, or sums, each of the coin pool terms $CP_{j,n}$ in state 318 to thereby determine the total coin pool $CP_{sel}$ for the selected discard strategy. The computing module 128 then determines, in decision state 320, whether the first approximation of the adjusted award $A_{approx,n}$ and coin pool term $CP_{j,n}$ has been calculated for all the N possible winning combinations.

If these calculations have not been performed for all of the winning combinations, the computing module 128 returns to state 320 where the first approximation of the next award $A_{approx,n}$ is calculated. In this fashion, the computing module 128 computes the first approximation of the adjusted award $A_{approx,n}$ and the corresponding coin pool term $CP_{j,n}$ for each winning combination and generates an accumulated coin pool $CP_j$ for the jth selected strategy. Once these computations have been performed for each of the possible winning combinations, the computing module 128 proceeds to a transition state labelled F in FIGS. 6A and 6B.

Referring now to FIG. 6B, from the transition state F, the computing module 128 computes the remainder coin pool RCP in state 324 by determining the difference between the optimum coin cool $CP_{opt}$, from in state 304, and the coin pool for the jth selected strategy $CP_j$ from state 318. The remaining coin pool RCP is representative of the difference in the total potential awards available to the video poker game 106 when the optimum strategy is used and the total potential awards available to the video poker game 106 when the selected discard strategy is used. Ideally, the computing module 128, when performing the adjusted awards function 300, is attempting to equate the total potential coins available to the selected discard strategy is used to the total potential coins available to the optimum strategy.

After the remaining coin pool RCP is determined in state 324, the computing module 128 sets a flag DONE-FLAG=1 in state 326 to initiate a loop wherein each of the N possible first approximation of the adjusted awards $A_{approx,n}$ are incremented by a single coin until the coins cannot be distributed anymore. The computing module 128 then proceeds to increment the first approximation of the adjusted award $A_{approx,n}$ for the most likely winning combination, e.g., in Table 1, pair of jacks or better, by one coin in state 330.

The computing module 128 then determines whether the first approximation of the adjusted award $A_{approx,n}$ as incremented in state 330 exceeds the MAXPAY variable. If the first approximation of the adjusted award $A_{approx,n}$ does exceed the MAXPAY variable, the computing module 128 proceeds to state 344 where it returns the first approximation of the adjusted award $A_{approx,n}$ to its original value prior to state 330 by decrementing $A_{approx,n}$ by one coin.

If the computing module 128 determines in decision state 331 that the first approximation of the adjusted award $A_{approx,n}$ as incremented in state 330 does not exceed the MAXPAY variable, the computing module 128 then computes the nth partial coin pool $PCP_n$ corresponding to the newly incremented award $A_{approx,n}$ for this winning combination in state 332 by multiplying the probability of attaining the winning combination corresponding to this award using the jth selected discard strategy $P_{n,j}$ and by the number of possible final outcomes for the selected discard strategy $DC_j$. Once the nth partial coin pool $PCP_n$ has been computed, the computing module 128 determines in decision state 334 whether the nth first approximated award $A_{approx,n}$ can be incremented by one coin by determining whether the corresponding partial coin pool PCP is less than the remaining coin pool RCP.

If the partial coin pool $PCP_n$ is less than the remaining coin pool RCP, the approximated award $A_{approx,n}$ can be incremented by the one coin, and the computing module 128 then adjusts the remaining coin pool RCP to reflect the decrease due to the incrementation of the first approximated award $A_{approx,n}$ in state 336 by subtracting from the previously calculated remaining coin pool RCP the partial coin pool PCP calculated in state 332. The computing module 128 then resets the DONE-FLAG flag to zero in state 340 and then proceeds to a transition state labelled G in FIGS. 6B and 6C.

If, in decision state 334, the computing module 128 determines that the first approximated award $A_{approx,n}$ cannot be increased by one coin as the resulting partial coin pool $PCP_n$ is greater than the remaining coin pool RCP, the computing module 128 then decreases $A_{approx,n}$ by one coin in state 338 returning $A_{approx,n}$ to the value it had prior to state 330. The computing module 128 then proceeds to the transition state labelled J in FIGS. 6B and 6C.

Referring now to FIG. 6C, from the transition state labelled J, the computing module 128 enters decision state 344 where it determines whether each of the first approximated awards $A_{approx,n}$ for the possible winning combinations shown in Table 1 have been incremented. If all the first approximated awards $A_{approx,n}$ have not been incremented in the above described fashion, the computing module 128 returns to state 330 wherein the next first approximated award $A_{approx,n}$ is incremented by one coin. In this fashion, the computing module 128 performs a loop comprised of states 330 through 344 whereby each of the first approximated awards $A_{approx,n}$ are incremented by one coin provided that the resulting partial coin pool PCP is less than the remaining coin pool RCP, and the remaining coin pool RCP is adjusted accordingly.

When the computing module 128 determines in decision state 345 that the process described above in states 330-344 has been performed for each of the first approximated awards $A_{approx,n}$. If the above-described process has not been performed for each of the first approximations of the adjusted awards $A_{approx,n}$, the computing module 128 returns to the state 310, via the transition state labelled H on both FIGS. 6B and 6C, to state 330 where the next first approximation of the adjusted award $A_{approx,n}$ is incremented by one coin. If the above-described process has been performed for each of the first approximation of the adjusted awards $A_{approx,n}$ the computing module 128 then determines whether the remaining coin pool RCP is too small to distribute in decision state 346. The remaining coin pool RCP is too small to distribute when there are too few coins in the remaining coin pool RCP to increment any one of the approximated awards $A_{approx,n}$. The remaining coin pool RCP is too small to distribute when none of the N first approximation of the adjusted awards $A_{approx,n}$ can be incremented by one coin and, at this point, the DONEFLAG flag will not have been set to zero. If there are sufficient coins to increment one of the approximated awards $A_{approx,n}$ and the DONEFLAG flag is set to zero, the computing module 128 returns to state 326 through the transition state labelled I on both FIGS. 6B and 6C where the DONEFLAG is reset to 1. Subsequently, the computing module 128 loops through states 326 through 346 until the remaining coin pool RCP is too small to distribute.

Once the computing module 128 determines that the remaining coin pool RCP is too small to distribute in decision state 346, the computing module 128 proceeds to state 348. In state 348, the first approximated awards $A_{approx,n}$ as incremented above, now constitute the adjusted awards $A_{adj,n}$ which are then stored in the RAM 142 (FIG. 3) of the computing module 128 and are subsequently returned to the video poker game 106 via the bi-directional communication link 126. Subsequently The computing module 128 proceeds to an end state 350.

In this fashion, the computing module 128 generates an adjusted awards table wherein the adjusted awards $A_{adj,n}$ given for the winning combinations have been adjusted from the original default award values $A_n$ to a new value whereby the expected value of this particular discard strategy $EV_j$ when calculated using the adjusted award values $A_{adj,n}$ is substantially equal to the expected value of the optimum discard strategy $EV_{opt}$ calculated using the default award $A_n$.

The operation of the video poker game 106 as modified by the present invention is further illustrated in the following example. Assume that the player has bet eight coins and has requested cards in state 202 and that the player was dealt a two of hearts, a two of clubs, a king of spades, a king of clubs, and a nine of diamonds in state 208 (FIG. 4A). The player has thus been dealt a winning hand where the player can receive sixteen coins for having two pairs as, as according to the default awards Table 1, the player receives two coins for each coin bet when the player has a winning combination consisting of two pairs.

In the expected value function 212 (FIGS. 4A and 5), the computing module 128 computes the expected values of each of the thirty-two possible discard strategies and the probabilities of obtaining the winning combinations shown in Table 1 using each of these thirty two discard strategies. In this example, the optimum strategy would be to discard the nine of diamonds and attempt to get a full house by receiving one of the remaining kings or twos. The expected value calculation for this strategy is illustrated in the following table:

| | Summary Of Expected Assuming Optimum Play (9 of diamonds discarded) | | | |
|---|---|---|---|---|
| Hand Type | Probability $P_n$ | | Award $A_n$ | Expected Value Term |
| Pair of Jacks | 0 | x | 1 | = 0 |
| Pair of Queens | 0 | x | 1 | = 0 |
| Pair of Kings | 0 | x | 1 | = 0 |
| Pair of Aces | 0 | x | 1 | = 0 |
| Two Pair | 43/47 | x | 2 | = 86/47 |
| Three of a Kind | 0 | x | 3 | = 0 |
| Straight | 0 | x | 4 | = 0 |
| Flush | 0 | x | 5 | = 0 |
| Full House | 4/47 | x | 6 | = 24/47 |
| Four of a Kind | 0 | x | 25 | = 0 |
| Straight Flush | 0 | x | 50 | = 0 |
| Royal Flush | 0 | x | 800 | = 0 |
| | | | | TOTAL $EV_{opt}$ 110/47 = 2,3404 |

However, assume that the player has selected a non-optimum discard strategy where he discards the nine of diamonds and the pair of twos. The expected value calculation for this strategy as performed in the function 212 is illustrated in the following table:

| | Summary Of Expected Value Assuming Non-Optimum Play (9 of diamonds, 2 of hearts, 2 of clubs discarded) | | | |
|---|---|---|---|---|
| Hand Type | Probability $P_n$ | | Award $A_n$ | Expected Value Term |
| Pair of Jacks | 0 | x | 1 | = 0 |
| Pair of Queens | 0 | x | 1 | = 0 |
| Pair of Kings | 11,520/16,215 | x | 1 | = 11,520/16,215 |
| Pair of Aces | 0 | x | 1 | = 0 |
| Two Pair | 2629/16,215 | x | 2 | = 5258/16,215 |
| Three of a Kind | 1852/16,215 | x | 3 | = 5556/16,215 |
| Straight | 0 | x | 4 | = 0 |
| Flush | 0 | x | 5 | = 0 |
| Full House | 169/16,215 | x | 6 | = 1014/16,215 |
| Four of a Kind | 45/16,215 | x | 25 | = 125/16,215 |
| Straight Flush | 0 | x | 50 | = 0 |
| Royal Flush | 0 | x | 800 | = 0 |
| | | | | TOTAL $EV_{sel}$ 24,473/16,215 = 1,5093 |

The video poker game 126 then sends a signal to the computing module 128 indicative of the new discard strategy in state 226 and the computing module 128 then performs the adjusted awards function 300. In this function 300, shown in FIGS. 6A, 6B, and 6C, the computing module 128 first determines in state 304 the optimum coin pool to be distributed according to the formula:

$$CP_{opt} = \sum_{n=1}^{N} P_{n,opt} * DC_j * A_n \quad (10)$$

which in this case yields $CP_{opt} = 303,600$ coins when eight coins are bet by the player.

The computing module 128 then computes in state 306 (FIG. 6A) the ratio between the expected value of the optimum discard strategy $EV_{opt}$ and the expected value $EV_j$ of the selected discard strategy of discarding the pair of twos and the nine and retaining the two kings:

$$R_j = EV_{opt}/EV_{sel}$$
$$= 2.3404/1.5093$$
$$= 1.5507$$

using the expected value figures previously determined in the function 212 (FIGS. 4A and 5).

The computing module 128 then computes the first approximation of the adjusted awards $A_{approx,n}$ using the selected discard strategy by multiplying, in state 310 (FIG. 6A) the default awards $A_n$ by the ratio $R_j$. In this example, the only winning combinations that the player can possibly attain are a pair (of kings), two pairs, three of a kind, a full house, and four of a kind. Hence, the probability of attaining the winning combination of a straight, a flush, a straight flush, or a royal straight flush using this discard strategy is zero. Consequently, to simplify this example, the calculations performed by the computing module 128 for these winning combinations are excluded.

Multiplying the default awards $A_n$ by the coins bet by the player and the ratio $R_j$ yields first approximation of the adjusted awards $A_{approx,n}$ as follows:

| A Pair | 8 × 1.5507 | = 12.405 | truncated to 12 |
| Two Pairs | 16 × 1.5507 | = 24.811 | truncated to 24 |
| Three of a Kind | 24 × 1.5507 | = 37.216 | truncated to 37 |
| Full House | 48 × 1.5507 | = 74.43 | truncated to 74 |

-continued

| Four of a Kind | 200 × 1.5507 | = 310.14 | truncated to 310 |

After the first approximation of the adjusted awards $A_{approx,n}$ are calculated in state 310, the computing module 128 then determines the coin pool term $CP_n$ for each of the nine awards in state 316 by multiplying the first approximation of the adjusted award $A_{approx,n}$ by the number of possible final outcomes for the selected discard strategy $DC_{sel}$ which is equal to 16,215, and by the probability of attaining the winning combination using the selected discard strategy $P_{n,sel}$. The probability $P_{n,sel}$ was determined in state 253 of the function 212 (FIG. 5). For this example, the coin pool terms $CP_n$ is given below:

| Winning Combination | $P_{n,sel}$ | $DC_{sel}$ | $A_{approx,n}$ | $CP_n$ |
|---|---|---|---|---|
| Pair | .710453284 | 16,215 | 12 | 138,240 |
| Two Pair | .162133827 | 16,215 | 24 | 63,096 |
| Three of a Kind | .114215233 | 16,215 | 37 | 68,524 |
| Full House | .010422448 | 16,215 | 74 | 12,506 |
| Four of a Kind | .002775208 | 16,215 | 310 | 13,950 |
| | | | $\Sigma CP_j =$ | 296,316 |

Subsequently, in state 318, the total coin pool that would be distributed under this discard strategy using the first approximation of the adjusted awards $A_{approx,n}$ given above would be the sum of the coin pool terms $CP_n$ calculated above or $\Sigma CP_j = 296,316$.

The computing module 128 then determines in state 324 the remainder coin pool RCP by subtracting the coin cool $CP_j$ from the optimum coin pool $CP_{opt}$ which in this case would yield:

RCP = $CP_{opt}$ − $CP_j$
RCP = 303,600 − 296,316
RCP = 7284

Hence, there are 7284 coins which will not be distributed using the first approximation of the adjusted awards $A_{approx,n}$. Consequently, the computing module 128 then enters a loop comprised of state 324 through 346 whereby the first approximation of the adjusted awards $A_{approx,n}$ are sequentially increased by one coin. For the first iteration of the loop, the partial coin pools $PCP_n$ corresponding to the newly adjusted first approximation $A_{approx,n}$ are as follows:

| Winning Combination | $P_{n,j}$ | $DC_j$ | $A_{approx,n}$ (as incremented) | $CP_{j,n}$ |
| --- | --- | --- | --- | --- |
| Pair | .710453284 | 16,215 | 13 → 12 | 11,520 → 0 |
| Two Pair | .162133827 | 16,215 | 25 | 2,629 |
| Three of a Kind | .114215233 | 16,215 | 38 | 1,852 |
| Full House | .010422448 | 16,215 | 75 | 169 |
| Four of a Kind | .002775208 | 16,215 | 311 | 45 |

However, increasing the $A_{approx,n}$ award by one coin for the winning combination of one pair results in the partial coin pool $PCP_n$ corresponding to this winning combination increasing to 11,520 coins which is greater than the remaining coin pool RCP of 7,284 coins. Consequently, the computing module 128 determines in decision state 334 (FIG. 6B) that the award for the winning combination of one pair cannot be increased by one coin, hence it remains at twelve coins for eight coins wagered.

After this first iteration, the remaining coin pool RCP is now 2,589 coins as each of the partial coin pool terms $PCP_n$ is subtracted from the remaining coin pool RCP in state 336 (FIG. 6B). The 2,589 remaining coins can still be distributed, so the computing module 128 continues to distribute the coins in the remaining coin pool RCP and in the second iteration, the first approximation of the adjusted award $A_{approx,n}$ for the winning combinations of three of a kind, full house and four of a kind are each incremented by one coin. After the second iteration, there are only 523 coins remaining to be distributed. For subsequent iterations, the first approximation of the adjusted award $A_{approx,n}$ for the winning combinations of full house and four of a kind are each incremented by one coin until there are fewer than 169 coins remaining. Then, only the first approximation of the adjusted award $A_{approx,n}$ of the four of a kind winning combination is incremented until there are less than 45 coins remaining.

The resulting adjusted awards $A_{adj,n}$ which are produced for the possible winning combinations are summarized below:

| Winning Combination | Default Award $A_n$ | Adjusted Award $A_{adj,n}$ |
| --- | --- | --- |
| One Pair | 8 | 12 |
| Two Pairs | 16 | 25 |
| Three of a Kind | 24 | 39 |
| Full House | 48 | 78 |
| Four of a Kind | 100 | 316 |

These adjusted awards result in only 5 out of 303,600 possible coins remaining undistributed, hence, the expected value of the selected strategy $EV_{sel}$ within 5/303,600 of the expected value of the optimum strategy $EV_{opt}$.

The foregoing description has described an implementation of the present invention wherein the video poker game 106 has been modified so that for any given strategy selected by the player, the expected value of the selected strategy is substantially equal to the expected value of the optimum strategy. Hence, players who do not play the optimum strategy in playing video poker and being able to recognize what constitutes the optimum strategy for any given hand, will win substantially the same amount of money over the long term as the more skilled players who can recognize and play the optimum strategy for any given hand.

Further, the foregoing description has also set forth a game where the player can select a strategy and then observe the adjusted awards displayed on a video display. Hence, the video poker game of the present invention also permits the player to evaluate awards given for winning combinations of cards attained using different discard strategies. Consequently, the video poker game 106 of the present invention permits greater player choice in playing video poker as the player can attempt to win larger awards using non-optimum discard strategies to attain less likely winning combinations. The larger awards are the result of the video poker game 106 adjusting the default awards $A_n$ using the adjusted awards function 300.

Furthermore, the foregoing description has described a video poker game 106 in which the awards for winning combinations are changed and displayed to the player depending on the discard strategy selected by the player. In one preferred embodiment, the awards are calculated so that the expected value of the selected strategy $EV_j$ is substantially equal to the expected value of the optimum strategy $EV_{opt}$. As can be appreciated, the calculations described above for substantially equating the expected value of the selected strategy $EV_{sel}$ to the expected value of the optimum strategy $EV_{opt}$ can also be used to equate the expected value of the selected strategy $EV_{sel}$ to a fraction of the optimum expected value $EV_{opt}$. Improving the expected value of a given strategy may be desirable for encouraging players to take riskier discard strategy, however, the game operator may wish to still retain more money from those players who take such riskier strategies.

The foregoing description of the present invention has also described one embodiment thereof as implemented on a video poker game. As can be appreciated, the present invention can also be implemented on different types of games where varying awards are given for pre-determined winning combinations of game elements. Specifically, the present invention can be implemented on any game where the player receives a first number of elements having identifying characteristics and then subsequently makes a choice whereby certain of the first number of elements are randomly replaced, and that the certain final combinations of the elements are determined to be winning combinations for which an award is given.

Additionally, the foregoing description has described a process by which the awards for winning combinations are adjusted when the player has selected a strategy other than the optimum strategy so that the expected value for the selected strategy using the adjusted awards is substantially equal to the expected value for the optimum strategy calculated using the default award values. Specifically, the awards for each of the winning combinations are adjusted and incremented so long as they do not exceed a maximum value. A person skilled in the art can readily appreciate that instead of adjusting and incrementing each of the awards for winning combinations, only selected awards can be adjusted and incremented while still substantially equating the overall expected value of the selected strategy using the adjusted awards to the expected value of the optimum strategy.

For example, in a video poker game, it may be desirable to only adjust and increment the awards for the winning combinations which are most popular with the players, e.g., four of a kind, full house etc. As another example, it may be desirable to create very large awards for the least likely combination, i.e., increase only the awards corresponding to those winning combinations for which the probability of attaining the winning combination is very low. Consequently, while the foregoing description has described one preferred method of adjusting the awards to equate the expected value of a selected strategy to the expected value of the optimum strategy, any number of possible methods of adjusting the awards to equate these expected values can be used without departing from the scope of the present invention.

Consequently, while the above detailed description has shown, described and pointed out fundamental novel features of the invention as applied to the embodiment discussed above, it will be understood that various omissions and substitutions and changes in the form and detail of the invention illustrated may be made by those skilled in the art, without departing from the spirit of the invention. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A player interactive gaming system comprising:
   a selected number of game elements having identifying characteristics, wherein certain combinations of said game elements are defined to be winning combinations;
   a player input system generating player input signals in response to a player selecting one of a plurality of game strategies;
   an element assigning system, having access to said game elements and receiving said player input signals, which assigns to said player one or more of said game elements;
   an award system responsive to said identifying characteristics of said game elements which assigns an award from a first set of awards to said player when said player receives a winning combination of game elements using a first game strategy; and
   an award adjustment system, responsive to said identifying characteristics of said game elements and to said game strategy selected by said player, which adjusts at least one of said first set of awards to define a second set of awards when said player selects a game strategy other than said first game strategy, wherein said award system assigns an award from said second set of awards when said player receives a winning combination of game elements using said game strategy other than said first game strategy.

2. The system of claim 1, wherein said game elements are comprised of a fifty two card playing deck and said winning combinations include a pair, two pair, a flush, a straight, three of a kind, a full house, four of a kind, a straight flush and a royal flush.

3. The system of claim 1, wherein said player input system is comprised of a plurality of buttons providing signals to a microprocessor which serves as said element assigning system.

4. The system of claim 3, wherein said award system receives signals from said microprocessor and dispenses awards for winning combinations when said microprocessor determines that said player has been assigned a winning combination.

5. The system of claim 4, wherein said first game strategy is an optimum strategy of discarding any number of said game elements which has the highest expected value of all of said plurality of game strategies open to said player, where said optimum expected value is calculated according to the following formula:

$$EV_{opt} = \sum_{n=1}^{N} A_n * P_{n,opt}$$

where

N: the total number of said winning combination of said game elements;

$EV_{opt}$: said expected value of said optimum strategy;

$A_n$: an award of said first set of awards given for the nth winning combination;

$P_{n,opt}$: the probability of attaining the nth winning combination using said optimum game strategy.

6. The system of claim 5, wherein said awards adjustment system adjusts one or more of said first set of awards $A_n$ for said winning combinations when said player selects a game strategy different from said optimum strategy, so that the expected value of said selected game strategy is substantially equal to said expected value of said optimum strategy $EV_{opt}$, where the expected value of said selected game strategy is calculated according to the following formula:

$$EV_{sel} = \sum_{n=1}^{N} A_{adj,n} * P_{n,set}$$

where

N: the total number of said winning combination of said game elements;

$EV_{sel}$: the expected value of said selected game strategy;

$A_{adj,n}$: an award of the first set of awards $A_n$, as adjusted by the award adjustment system to define the second set of awards, given for the nth winning combination;

$P_{n,sel}$: the probability of attaining the nth winning combination using the selected game strategy.

7. The system according to claim 6, wherein said award adjustment system adjusts one or more of said first set of awards $A_n$ by multiplying each of said first set of awards $A_n$ by the ratio $R_j$ between the expected value of said optimum strategy $EV_{opt}$ and the expected value of said selected strategy calculated using said first set of awards $A_n$.

8. The system according to claim 7, wherein said awards $A_n$ for said winning combinations are coins, and said award adjustment system further adjusts one or more of said first set of awards $A_n$ by truncating the product of each of said first set of awards $A_n$ multiplied by said ratio $R_j$ to establish a first approximation of adjusted awards $A_{approx,n}$.

9. The system according to claim 8, wherein said award adjustment system further adjusts said first set of awards by:

(1) computing an optimum coin pool $CP_{opt}$ according to the following formula:

$$CP_{opt} = \sum_{n=1}^{N} P_{n,opt} * DC_{opt} * A_n$$

where
- N: the total number of said winning combinations;
- $P_n$: the probability of attaining the nth winning combination using said optimum strategy;
- $DC_{opt}$: the total number of final outcomes of selecting said game elements using said optimum strategy;
- $A_n$: the award of said first set of awards corresponding to said nth winning combination;

(2) computing a coin pool for said selected game strategy $CP_{sel}$ according to the following formula:

$$CP_{sel} = \sum_{n=1}^{N} P_{n,sel} * DC_{sel} * A_{approx,n}$$

where
- N: the total number of said winning combinations;
- $P_{n,sel}$: the probability of attaining the nth winning combination using said selected game strategy;
- $DC_{sel}$: the total number of final outcomes of selecting said game elements using said selected strategy;
- $A_{approx,n}$: is said first approximation of said second set of awards corresponding to said nth winning combination;

(3) computing a remaining coin pool RCP by subtracting said selected coin pool $CP_{sel}$ from said optimum coin pool $CP_{opt}$, (4) sequentially incrementing each said first approximation of said adjusted awards $A_{approx,n}$ by one coin and (5) decreasing said remaining coin pool RCP until said remaining coin pool RCP contains insufficient coins to further increment any of said first approximations of said awards $A_{approx,n}$ by one coin.

10. The system of claim 9, wherein each of said first approximations of said adjusted awards $A_{approx,n}$ is incremented by one coin only when a partial coin pool $PCP_n$ corresponding to said incremented first approximation of said adjusted award $A_{approx,n}$ is less than said remaining coin pool RCP wherein said partial coin pool $PCP_n$ is determined according to the following formula:

$$PCP_n = P_{n,sel} * DC_{sel}$$

where:
- $P_{n,sel}$: the probability of attaining the nth winning combination using said selected strategy; and
- $DC_{sel}$: the total number of final outcomes of selecting said game elements using said selected strategy.

11. The system of claim 10, wherein said remaining coin pool RCP is decreased by a number of coins equal to said partial coin pool $PCP_n$ when said partial coin pool $PCP_n$ for a given winning combination is less than said remaining coin pool RCP.

12. A player interactive video draw poker game
- a video screen;
- a plurality of individual card signals representative of playing cards, wherein certain combinations of said card signals are defined to be winning combinations;
- a player input unit providing a plurality of player input signals, including a strategy input signal indicative of player selection of a game strategy, in response to player manipulation of said input unit;
- a central processing unit, responsive to said plurality of card signals and said player input signals and sending signals to said video screen, which assigns a first number of said individual card signals in response to a first player input signal, and which replaces any number of said first number of said card signals in response to receiving said strategy input signal and a deal signal, and which determines whether said player has been assigned one of said winning combinations;
- an awards system responsive to signals from said central processing unit which assigns one of a first number awards to said player when said player has been assigned one of said winning combinations after selecting an optimum game strategy; and
- an awards adjustment system responsive to signals from said central processing unit which adjusts one or more of said first number of awards to define a second number of awards when said player has selected a non-optimum game strategy other than said optimum game strategy, wherein said award system assigns an award from said second number of awards when said player receives a winning combination of card signals using said selected non-optimum game strategy.

13. The game of claim 12, wherein said plurality of individual card signals are representative of a fifty two card playing deck and said winning combinations include a pair of jacks or better, two pair, three of a kind, a flush, a straight, a full house, four of a kind, a straight flush, and a royal flush.

14. The game of claim 13, wherein said first number of awards for said winning combinations are given by the following table:

| WINNING COMBINATION | AWARD AMOUNT (Coins Won Per Coins Wagered) |
|---|---|
| Pair of Jacks or Better | 1 |
| Two Pairs | 2 |
| Three of a Kind | 3 |
| Straight | 4 |
| Flush | 5 |
| Full House | 6 |
| Four of a Kind | 25 |
| Straight Flush | 50 |
| Royal Flush | 800 |

15. The game of claim 12, wherein said second number of awards for said winning combinations are displayed on said video screen in response to said central processing unit receiving said strategy signal to thereby permit player evaluation of said second number of awards.

16. The game of claim 12, wherein said optimum game strategy has the highest expected value of all the game strategies open to said player as calculated according to the following formula:

$$EV_j = \sum_{n=1}^{N} A_n * P_{n,j}$$

where
- N: the total number of said winning combination of said game elements;

EV$_j$: said expected value of a jth game strategy;

A$_n$: said award of said first number of said awards given for the nth winning combination;

P$_{n,j}$: the probability of attaining the nth winning combination using said jth game strategy.

17. The game of claim 16, wherein said award adjustment system adjusts one or more of said first number of awards A$_n$ so that the expected value of said game strategy selected by said player EV$_{sel}$ is substantially equal to said expected value of said optimum strategy EV$_{opt}$ where said expected value of said selected game strategy is calculated according to the following formula:

$$EV_{sel} = \sum_{n=1}^{N} A_{adj,n} * P_{n,sel}$$

where

N: the total number of said winning combination of said game elements;

EV$_{sel}$: the expected value of said selected strategy;

A$_{adj,n}$: an adjusted award of said second number of awards given for the nth winning combination;

P$_{n,sel}$: the probability of attaining the nth winning combination using said selected game strategy.

18. The game of claim 17, wherein said award adjustment system adjusts only a limited number of said first number of said awards A$_n$ to thereby substantially equate said expected value of said selected strategy EV$_{sel}$ to said expected value of said optimum strategy EV$_{opt}$.

19. The game of claim 17, wherein said award adjustment system adjusts said first number of said awards A$_n$ by multiplying each of said first number of awards A$_n$ by a ratio R$_j$ between the expected value of said optimum strategy EV$_{opt}$ and said expected value of said selected strategy calculated using said first number of awards A$_n$.

20. The game of claim 19, wherein said award adjustment system further truncates said product of each of said first number of said awards A$_n$ as multiplied by said ratio R$_j$ to establish a first approximation of each of said adjusted awards A$_{approx,n}$.

21. The system according to claim 20, wherein said award adjustment system further adjusts said first number of awards by:

(1) computing an optimum coin pool CP$_{opt}$ according to the following formula:

$$CP_{opt} = \sum_{n=1}^{N} P_{n,opt} * DC_{opt} * A_n$$

where

N: the total number of said winning combinations;

P$_{n,opt}$: the probability of attaining the nth winning combination using said optimum strategy;

DC$_{opt}$: the total number of draw combinations of said card signals using said optimum strategy;

A$_n$: said first award for said nth winning combination;

(2) computing a coin pool for said selected strategy CP$_{sel}$ according to the following formula $$CP_{sel} = \sum_{n=1}^{N} P_{n,sel} * DC_{sel} * A_{approx,n}$$

where

N: the total number of said winning combinations;

P$_{n,sel}$: the probability of attaining the nth winning combination using said selected strategy;

DC$_{sel}$: the total number of draw combinations of said card signals using said selected strategy;

A$_{approx,n}$: is said first approximation of said adjusted award corresponding to said nth winning combination;

(3) computing a remaining coin pool RCP by subtracting said selected coin pool CP$_{sel}$ from said optimum coin pool CP$_{opt}$, (4) sequentially incrementing a selected number of said first approximation of said adjusted awards A$_{approx,n}$ by one coin and (5) decreasing said remaining coin pool RCP until said remaining coin pool RCP contains insufficient coins to further increment any of said first approximations of said awards A$_{approx,n}$.

22. The system of claim 21, wherein said first approximations of said adjusted awards A$_{approx,n}$ are incremented by one coin only when a partial coin pool PCP$_n$ corresponding to said incremented first approximation of said adjusted award A$_{approx,n}$ is less than said remaining coin pool RCP wherein said partial coin pool PCP$_n$ is determined according to the following formula:

$$PCP_n = P_{n,sel} * DC_{sel}$$

where:

P$_{n,sel}$: the probability of attaining the nth winning combination using the selected strategy; and DC$_{sel}$: the total number of final outcomes of selecting said game elements using the selected strategy.

23. The system of claim 22, wherein said remaining coin pool RCP is decreased by a number of coins equal to said partial coin pool PCP$_n$ when said partial coin pool PCP$_n$ for a given winning combination is less than said remaining coin pool RCP.

24. A player interactive gaming system comprising:

assignment means for assigning a first number of game elements having identifying characteristics to a player, wherein certain combinations of said game elements are designated winning combinations;

selection means for enabling said player to select one of a plurality of game strategies for receiving new game elements;

award means for assigning to said player one of a first plurality of awards corresponding to said winning combinations when said player has selected an optimum game strategy and has been assigned a final number of said game elements containing one of said winning combinations; and award adjustment means for adjusting one or more of said first plurality of awards to define a second plurality of awards when said player has selected a non-optimum game strategy, wherein said awards means assigns to said player one of said second plurality of awards when said player has received a winning combination of game elements using said non-optimum game strategy.

25. The system of claim 24, further comprising a display means for displaying to said player representations of said assigned game elements, said first plurality of awards, and said second plurality of awards.

26. The system of claim 25, wherein said assignment means is comprised of a central processing unit which assigns a plurality of individual card signals representative of playing cards to said player.

27. The system of claim 26, wherein said selection means is comprised of a plurality of buttons sending a plurality of signals to said central processing unit including a game strategy select signal, and a deal signal.

28. The system of claim 25, wherein said award means is comprised of a coin dispensing system which dispenses coins to said player when said player has attained one of said plurality of winning combinations.

29. The system of claim 25, wherein said awards adjustment means is comprised of a system which computes the expected value of both said optimum game strategy and said non-optimum game strategy selected by said player using said first plurality of awards and then adjusts one or more of said first plurality of awards to define said second plurality of awards so that the expected value of said non-optimum game strategy calculated using said second plurality of awards is substantially equal to the expected value of said optimum game strategy computed using said first plurality of awards.

30. The system of claim 27, wherein said display means displays said adjusted awards to said player prior to said assignment means implementing said selected game strategy in response to receiving said deal signal thereby allowing said player to review said adjusted awards and select a different game strategy.

31. A method of playing an interactive gaming system comprising the steps of:
    assigning a first number of game elements having identifying characteristics to a player, wherein certain combinations of said game elements are designated winning combinations;
    replacing any number of said first number of said game elements according to a game strategy selected by said player;
    assigning said player an award from a first plurality of awards when said player has selected an optimum game strategy and has then been assigned a final combination of said game elements which include one of said winning combinations;
    adjusting one or more of said first plurality of awards to define a second plurality of awards when said player has selected a non-optimum game strategy; and
    assigning an award from said second set of awards when said player has been assigned a final combination of game elements which include one of said winning combinations using said non-optimum game strategy.

32. The method of claim 27, wherein said step of assigning a first number of game elements comprises assigning said player a first number of card signals representative of playing cards and said winning combinations of said game elements correspond to the winning combinations of playing cards in the game of draw poker.

33. The method of claim 31, wherein said optimum game strategy is defined to be said game strategy having the optimum or highest expected value calculated according to the following formula:

$$EV_{opt} = \sum_{n=1}^{N} A_n * P_{n,opt}$$

where

N: the total number of said winning combination of said game elements;

$EV_{opt}$: said optimum expected value $A_n$: said award given for the nth winning combination;

$P_{n,opt}$: the probability of attaining the nth winning combination using said optimum game strategy.

34. The game of claim 33, wherein said step of adjusting one or more of said first plurality of awards to define a second plurality of awards comprises adjusting said awards $A_n$ so that the expected value of said non-optimum game strategy selected by said player is substantially equal to said expected value of said optimum game strategy where said expected value of said non-optimum selected game strategy is calculated according to the following formula $$EV_{sel} = \sum_{n=1}^{N} A_{adj,n} * P_{n,sel}$$

where

N: the total number of said winning combination of said game elements;

$EV_{sel}$: said expected value of said non-optimum selected game strategy;

$A_{adj,n}$: an adjusted award from said second plurality of awards given for the nth winning combination;

$P_{n,sel}$: the probability of attaining the nth winning combination using said non-optimum selected game strategy.

35. The method according to claim 34, wherein said step of adjusting said first plurality of awards to define a second plurality of awards further comprises multiplying each of said first plurality of awards $A_n$ by a ratio $R_j$ between the expected value of said optimum game strategy $EV_{opt}$ and said expected value of said non-optimum selected game strategy calculated using said first plurality of awards.

36. The method according to claim 35, wherein said step of adjusting said first plurality of awards to define a second plurality of awards further comprises truncating said product of each of said first plurality of awards $A_n$ as multiplied by said ratio $R_j$ to establish a first approximation of each of said second plurality of awards $A_{approx,n}$.

37. The method according to 36, wherein said step of adjusting said first plurality of awards further comprises the steps of:

(1) computing an optimum coin pool $CP_{opt}$ according to the following formula:

$$CP_{opt} = \sum_{n=1}^{N} P_{n,opt} * DC_{opt} * A_n$$

where

N: the total number of said winning combinations;

$P_n$: the probability of attaining the nth winning combination using said optimum game strategy;

$DC_{opt}$: the total number of draw combinations of said card signals using said optimum game strategy;

$A_n$: said first award for said nth winning combination;

(2) determining a coin pool $CP_{sel}$ according to the following formula:

$$CP_{sel} = \sum_{n=1}^{N} P_{n,sel} * DC_{sel} * A_{approx,n}$$

where
N: the total number of said winning combinations;
$P_{n,sel}$: the probability of attaining the nth winning combination using said non-optimum selected game strategy;
$DC_{sel}$: the total number of draw combinations of said card signals using said non-optimum selected game strategy;
$A_{approx,n}$: is said first approximation of said second plurality of adjusted award corresponding to said nth winning combination;
(3) computing a remaining coin pool RCP by subtracting said selected coin pool $CP_{sel}$ from said optimum coin pool $CP_{opt}$;
(4) sequentially incrementing each said first approximation of said second plurality of adjusted awards $A_{approx,n}$ by one coin; and
(5) decreasing said remaining coin pool RCP until said remaining coin pool RCP contains insufficient coins to further increment any of said first approximations of said second plurality of awards $A_{approx,n}$.

38. The system of claim 37, wherein the step of sequentially incrementing each of said first approximation of said second plurality of awards $A_{approx,n}$ comprises incrementing said first approximation of said second plurality of awards $A_{approx,n}$ by one coin only when a partial coin pool $PCP_n$ corresponding to said incremented $A_{approx,n}$ is less than said remaining coin pool RCP wherein said partial coin pool $PCP_n$ is determined according to the following formula:

$PCP_n = P_{n,sel} * DC_{sel}$ where:
$P_{n,sel}$: the probability of attaining the nth winning combination using said non-optimum selected game strategy; and
$DC_{sel}$: the total number of final outcomes of selecting said game elements using said non-optimum selected game strategy.

39. The system of claim 38, wherein said step of decreasing said remaining coin pool RCP is comprised of decreasing said remaining coin pool RCP by a number of coins equal to said partial coin pool $PCP_n$ when said partial coin pool $PCP_n$ for a given winning combination is less than said remaining coin pool RCP.

40. A method of playing an interactive gaming system comprising the steps of:
assigning a first number of game elements having identifying characteristics to a player, wherein certain combinations of said game elements are designated winning combinations;
assigning additional game elements to said player according to a game strategy selected by said player;
assigning said player an award from a first plurality of awards when said player has selected an optimum game strategy and has then been assigned a final combination of said game elements which include one of said winning combinations;
adjusting one or more of said first plurality of awards to define a second plurality of awards when said player has selected a non-optimum game strategy; and
assigning an award from said second set of awards when said player has been assigned a final combination of game elements which include one of said winning combinations using said non-optimum game strategy.

* * * * *